United States Patent
O'Connell

(10) Patent No.: US 10,019,447 B1
(45) Date of Patent: Jul. 10, 2018

(54) METHODS AND APPARATUS FOR MANAGING OBJECTS IN A STORAGE ENVIRONMENT

(75) Inventor: Mark O'Connell, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 592 days.

(21) Appl. No.: 12/800,448

(22) Filed: May 14, 2010

(51) Int. Cl.
*G06F 7/00* (2006.01)
*G06F 17/30* (2006.01)

(52) U.S. Cl.
CPC ...... *G06F 17/30067* (2013.01); *G06F 17/301* (2013.01); *G06F 17/3023* (2013.01); *G06F 17/30283* (2013.01)

(58) Field of Classification Search
CPC ......... G06F 17/30067; G06F 17/30283; G06F 17/301; G06F 17/3023
See application file for complete search history.

(56) References Cited

U.S. PATENT DOCUMENTS 7,778,972 B1 *  8/2010  Cormie et al. ............... 707/626
2009/0248757 A1 * 10/2009  Havewala et al. ........... 707/203

* cited by examiner

*Primary Examiner* — Paul Kim
(74) *Attorney, Agent, or Firm* — Krishnendu Gupta; Robert Kevin Perkins

(57) ABSTRACT

Some embodiments are directed to accessing a content unit stored in a storage environment that includes a plurality of storage clusters, wherein multiple versions of the content unit are stored on at least two different clusters in the storage environment. The storage environment and/or the requesting entity may identify the at least two storage clusters that store the content unit and select one of clusters as storing a valid version of the content unit.

20 Claims, 18 Drawing Sheets

| Object Identifier | Write Timestamp |
|---|---|
| ABC | 10-25-2007 10:45 |
| DEF | 11-18-2008 21:36 |
| GHI | 12-14-2009 7:25 |

FIG. 10

METHODS AND APPARATUS FOR MANAGING OBJECTS IN A STORAGE ENVIRONMENT

FIELD OF THE INVENTION

The present invention relates to data storage and, more particularly, to methods and apparatus for managing objects in a storage environment.

DESCRIPTION OF THE RELATED ART

The capacity and performance of a data storage system depends on the physical resources of the storage system. For example, the quantity of data that a storage system is capable of storing is dependent on the number and capacity of the physical storage devices that the storage system possesses. As the quantity of data stored on the storage system approaches the storage capacity of the storage system, it may be desired to increase the storage system capacity by adding additional physical storage devices to the storage system. However, there may be physical limits imposed by the hardware configuration of the storage system on the number of storage devices that the storage system may have. Consequently, when a storage system approaches or nears its storage capacity, it may no longer be possible or desirable to add more physical storage devices to the storage systems. Rather, if it is desired to increase storage capacity, one or more additional storage systems may be used.

SUMMARY OF THE INVENTION

One embodiment is directed to a method of accessing a content unit stored in a storage environment that includes a plurality of storage clusters, wherein the content unit is stored on at least two of the plurality of storage clusters. The method comprises acts of: initiating an operation to modify the content unit; causing each of the plurality of storage clusters to perform a search for the content unit; identifying, based on the search, the at least two storage clusters that store the content unit; selecting one of the at least two of the plurality of storage clusters as storing a valid version of the content unit; performing the operation to modify the content unit on the valid version of the content unit stored by the selected one of the plurality of storage clusters; and when at least one of the at least two clusters does not store information indicating that the content unit stored thereon is an invalid version, storing validity information on each of the at least two storage clusters that does not store information indicating that the content unit stored thereon is an invalid version, where the validity information indicates the content unit stored thereon is an invalid version.

Another embodiment is directed to at least one computer readable medium encoded with instructions that when executed by one of a plurality of storage clusters in a storage environment, perform a method comprising acts of: receiving a request, from a host computer, to read the content unit, the request identifying the content unit via an object identifier assigned to the content unit; causing each of the plurality of storage clusters to perform a search for the content unit; receiving, from each of the plurality of storage clusters that stores the content unit, a validity indicator for the content unit; determining, based on the validity indicators, which one of the plurality of storage clusters that stores the content unit stores a valid version of the content unit; and returning the valid version of the content unit in response to the request.

A further embodiment is directed to a computer system that operates as one of a plurality of storage clusters in a storage environment, the storage cluster comprising: at least one memory that stores processor-executable instructions for accessing a content unit, wherein the content unit is stored on at least two of the plurality of storage clusters; and at least one microprocessor, coupled to the at least one memory, that executes the processor-executable instructions to: initiate an operation to modify the content unit; cause each of the plurality of storage clusters to perform a search for the content unit; identify, based on the search, the at least two storage clusters that store the content unit; select one of the at least two of the plurality of storage clusters as storing a valid version of the content unit; perform the operation to modify the content unit on the valid version of the content unit stored by the selected one of the plurality of storage clusters; and store a status content unit on each of the at least two clusters that does not already store a status content unit for the content unit, wherein the status content unit indicates which of the at least two clusters stores the valid version of the content unit.

BRIEF DESCRIPTION OF THE DRAWINGS

FIG. 10 is a diagram of a database table that associates the write timestamp for a content unit with an object identifier for the content unit, in accordance with some embodiments;

DETAILED DESCRIPTION

Figure 1:
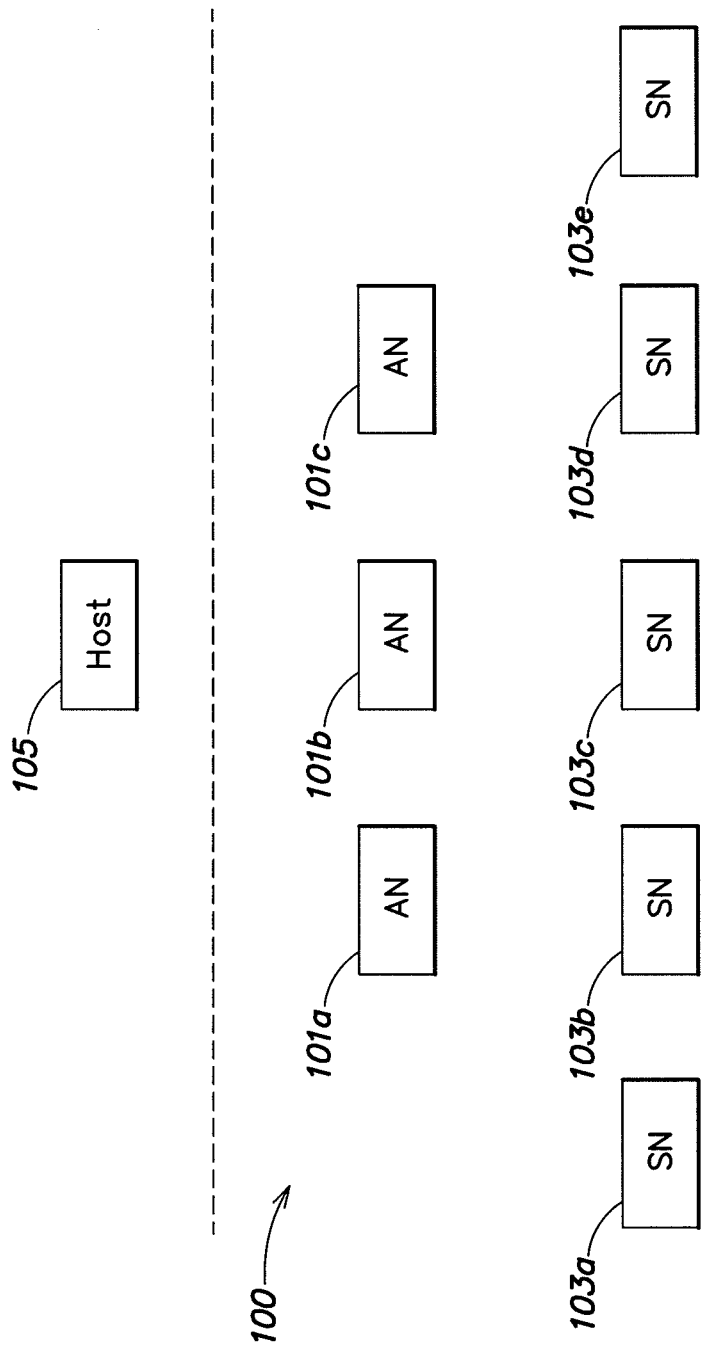
FIG. 1 is a block diagram of a distributed storage environment on which embodiments of the present invention may be implemented.

I. Challenges Related to Single Instance Storage in Multi-Cluster Storage Environments Some embodiments relate to challenges presented in performing single instancing of objects stored in a multi-cluster distributed content addressable storage environment.

A. Object Addressable Storage Systems

Some storage systems require that the access requests identify data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated data is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier, and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of a type of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

B. Single Instance Storage

Single instance storage is a technique for permitting users to store only a single copy of the same content unit within the storage system. For example, if a document is e-mailed to fifty different e-mail recipients, each e-mail recipient may wish to archive the document on the same storage system. However, storing fifty copies of the same document is an inefficient use of storage space. Thus, in a system that performs single-instance storage, a first of the fifty users would be permitted to store the document. However, when the system receives subsequent requests to store the document (e.g., from any of the other 49 recipients of the document), the system may recognize that it already stores a copy of the document and may not store additional copies of the document in response to these user requests.

The use of content addresses as identifiers for content units in a CAS storage system may facilitate enforcing single instance storage. That is, as explained above, the content address for a content unit may be computed by hashing all or a portion of the unit of content and using the resulting hash value as all or part of the content address. When a request to store a content unit is received, the CAS system may perform hashing on the content unit using a hash function (e.g., MD5 or any other suitable hash function) to generate a hash value and may compare that hash value to the hash values in the content addresses that the CAS system already stores. If there is a match, then the CAS system may determine that it already stores a copy of the content unit that is requested to be stored.

Some systems that enforce single instance storage of objects may still create and store mirror copies of objects for backup and recovery purposes. For example, when an object is stored on a system, the system may create a mirror copy of the object that is stored in a different storage location within the system. In this way, if one copy of the object becomes unavailable, lost, or corrupted, the other copy may serve as a backup. However, when enforcing single instance storage, the system does not create additional copies of an object in response to user requests to store an object that is already stored on the storage system.

C. Distributed Storage Environments

In some embodiments, an OAS or CAS system may be implemented in a distributed storage environment. An example of a distributed storage environment 100 is shown in FIG. 1. Distributed storage environment 100 includes a plurality access nodes 101a-101c and a plurality of storage nodes 103a-103e. Access nodes 101 may receive and respond to access requests from a host computer 105, and storage nodes 103 may store data sent to storage environment 100 by host computer 105. Access nodes 101 and storage nodes 103 may be coupled by a network (not shown) and communicate over the network such that each node may make its presence on the network known to the other nodes. In this manner, the nodes may operate together to process access requests and store data for host computer 105.

Each node may include processing resources (e.g., processor and memory) and storage devices. The nodes communicate with each other to store data, respond to access requests, and perform other environment functions. To a user of the storage environment (e.g., the host computer 105 or an application program executing thereon), the storage environment may appear as single entity. That is, the user need not be aware that the storage environment includes a plurality of separate nodes or on which storage node a certain unit of data is stored or mirrored.

To increase the storage capacity of the storage environment 100, more storage nodes may be added and coupled to the network. These additional storage nodes may make their presence known on the network, thus allowing access nodes 101 to employ the additional storage in the storing of data. Adding more storage nodes to the storage network without increasing the number of access nodes may result in the access nodes acting as a bottleneck for the storage environment and a degradation in performance. Thus, it may desirable when increasing the number of storage nodes to also increase the number of access nodes.

Storage environment 100 may perform a number of functions, such as determining on which storage node 103 to store data in response to a write request from host 105, determining on which storage node 103 data is stored in response to a read request from host 105, performing garbage collection of data that may be deleted from the storage environment, enforcing retention periods that specify a period of time that data should not be deleted from the storage environment, mirroring data (i.e., creating one or more mirror copies on different nodes of the storage environment), self-healing to compensate for failure of one or more nodes, and other functions. Such functions may be performed by storage nodes, access nodes, or both, and performing such functions may cause network traffic between the nodes.

For example, to perform self-healing functions, other nodes may detect when a node fails. In response, the environment 100 may re-direct access requests to data stored on the failed node to other nodes that store a mirrored copy of that data and may build another mirror for continued fault tolerance. A node may broadcast keep-alive messages on the network to indicate that it is operational and has not failed. If keep-alive messages from that node are not received by other nodes, the other nodes may determine that the node has failed. Adding more nodes to the storage environment causes more keep-alive messages to be transmitted on the network and results in more network traffic.

As another example, the storage environment 100 may maintain an index such as the blob location index (BLI), to aid in locating data. The BLI may specify on which storage node units of data are stored. Each access or storage node in the network may be responsible for administering a portion of the BLI. Because the BLI may be distributed across the access and/or storage nodes, maintaining and updating the BLI when units of data are written to or deleted from the storage environment causes network traffic to be generated among nodes. Adding more nodes may cause the administration responsibilities of the BLI to be shared among a greater number of nodes, thus causing a greater amount of network traffic to be generated.

Other functions, such as performing garbage collection, locating content on the storage environment (e.g., via a broadcast message to all nodes), and re-ranging the BLI (i.e., when nodes are added or removed from the storage environment), may cause a greater amount of network traffic as nodes are added to the storage environment. Such increased network traffic may result in a decrease in performance of the storage environment.

D. Multi-Cluster Storage Environments

As discussed above, storage nodes 103 may be added to the storage environment to increase the storage capacity of the storage environment. Additionally, access nodes 101 may be added to counteract degradation in performance caused by adding the additional storage nodes. However, because adding access nodes and storage nodes causes increased network traffic, once a certain number of nodes in the storage environment is reached, the performance benefit gained by adding additional nodes is offset at least somewhat by the increased network traffic generated by the nodes in the storage environment, as well as the increased amount of processing resources used in performing the infrastructure functions (such as those described above) that support the storage environment. Thus, as additional nodes are added to the storage environment to increase storage capacity and/or performance, the overall performance of the storage environment may increase less than expected or desired, or might in some cases even decrease. This performance impact is referenced below as performance degradation, which term is used herein to refer to not only actual decreases in performance, but also the diminishing returns in performance improvements achieved by the addition of an additional storage resource, such as an access node or storage node.

In some embodiments, separate storage clusters may be arranged to work together to provide combined storage. For example, each of a plurality of storage clusters in a storage environment may be implemented as a separate OAS or CAS system. These storage clusters may be independent so that the addition of an additional storage resource in one cluster does not cause the performance degradation issues discussed above for other clusters. As used herein, the term storage cluster refers to a group of one or more interconnected nodes that share at least one software utility that logically connects them. For example, the nodes of a storage cluster may share a self-healing software utility, such that nodes in a cluster monitor keep-alive messages transmitted by other nodes in that cluster, but not by nodes outside the cluster. The nodes may also share a common BLI so that the BLI of one storage cluster may be independent of the BLI of any other storage cluster. The nodes of a storage cluster may also, or alternatively, share other utilities such as a garbage collection utility and/or a data mirroring utility that keeps track of where data stored in the cluster is mirrored. In one embodiment, each node in a cluster knows the address (e.g., an IP address) of every other node in the cluster, although the present invention is not limited in this respect.

Because nodes in a storage cluster do not share software utilities with nodes outside the cluster (e.g., in a different storage cluster), the internal network traffic and use of processing resources of the nodes within one storage cluster does not affect the performance of any other storage cluster. Consequently, an additional storage cluster may be added to a storage environment to increase storage capacity without experiencing the above-described performance degradation issues.

It should be appreciated that the description of the types of software utilities that may be shared among nodes in a cluster (but not shared among nodes in different clusters) is provided merely for the purposes of illustration, and that the aspects of the present invention described herein are not limited to use in a storage environment wherein the nodes in a storage cluster share the particular types of software utilities discussed above, or any other particular type of software utility.

Figure 2:
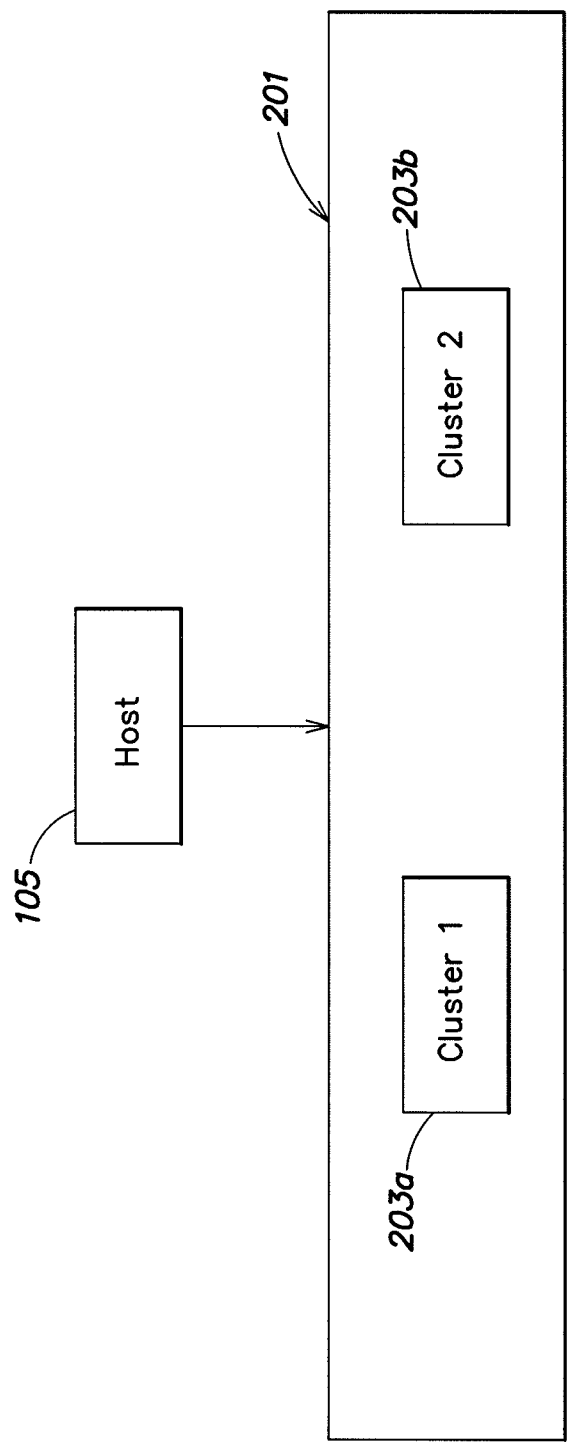
FIG. 2 is a block diagram of a host computer interacting with a storage environment with multiple clusters.

In one embodiment of the invention, multiple storage clusters are managed in a manner that is transparent to users (e.g., host computers or application programs executing thereon) of the storage environment, so that users need not know on which storage cluster a particular unit of data is stored to access that unit of data. For example, as shown in FIG. 2, storage environment 201 may include storage clusters 203a and 203b. Host computer 105 and/or application programs executing thereon need not be aware the storage environment 201 comprises two independent storage clusters, but rather may view storage environment 201 as a single unified storage environment. Thus, application programs that store data to and retrieve data from the storage environment may treat the multiple storage clusters as a single storage environment, without knowledge of on which cluster data written to the storage environment is stored. Thus, in one embodiment of the invention, when an application program (e.g., on a host) issues a write request for a unit of data to the storage environment, it is determined on which storage cluster the unit of data is to be written, and when the application issues a read request, it is determined on which storage cluster the data is stored, both in a manner transparent to the application program.

There are variety of possible implementation techniques as to where the aspects of the computer system that determine on which storage cluster to store a unit of data and that retrieve a previously written unit of data from the appropriate cluster are practiced. Some examples of possibilities are described in U.S. patent application Ser. No. 10/787,337, titled Methods And Apparatus For Increasing Data Storage Capacity, and filed on Feb. 26, 2004. This application is hereby incorporated by reference in its entirety.

E. Challenges Presented in Connection with Single Instance Storage in A Multi-Cluster CAS Distributed Storage Environment Enforcing single instance storage between storage clusters in a storage environment that has multiple clusters presents challenges. For example, if one cluster in a storage environment receives a request to store a content unit, that cluster may be able determine whether it already stores a copy of the content unit, but it may not have information available to it to be able to determine whether that content unit is stored on any of the other clusters in the storage environment.

One possible technique for addressing this challenge is, each time a request to store a content unit on a storage cluster in a multi-cluster storage environment is received, to send an instruction to each storage cluster in the storage environment (either serially or in parallel) to determine whether that storage cluster already stores a copy of the content unit. If any storage cluster in the storage environment already stores a copy of the content unit, a new copy of the content need not be stored in response to the read request. However, this technique may not be desirable because it increases the amount of time taken and resources expended to complete processing of a write request. That is, each a time a request to store a new content unit is received, each storage cluster in the storage environment must perform a search to determine whether it stores a copy of the content unit. This may be a time and resource intensive process.

Not enforcing single instance storage and allowing users to store multiple copies of the same content unit on different storage clusters may also present challenges. For example, if a copy of a content unit is stored on two different clusters and each copy has the same identifier, one copy of the content unit may be modified and thus be inconsistent with the other content unit. As a result, when a read request for the content unit is received in the storage environment, the content that is returned to the user that initiated the request may be different depending on which storage cluster in the storage environment processed the read request.

Figure 3:
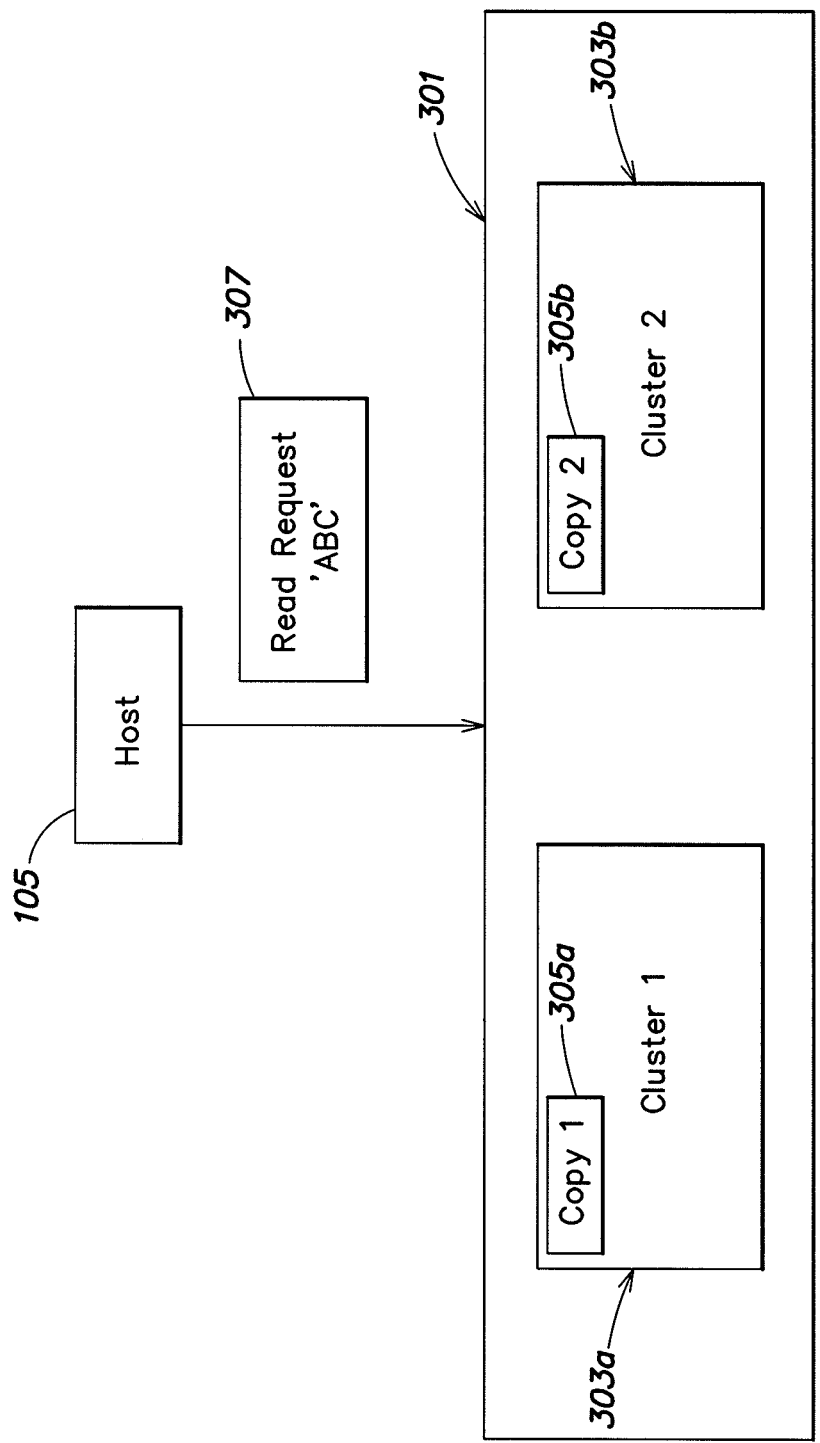
FIG. 3 is a block diagram of a host computer sending a request for a content unit stored on two different clusters in a storage environment.

For example, as shown in FIG. 3, storage environment 301 may have two storage clusters 303a and 303b. Each storage cluster may store a copy of the same content unit and that content unit may be assigned the object identifier or content address "ABC." Thus, as shown in FIG. 3, content unit 305a is a first copy of the content unit identified by the identifier "ABC," and is stored on cluster 303a. Content unit 305b is a second copy of the content unit identified by the identifier "ABC" and is stored on cluster 303b. However, the content of content unit 305a may be modified so that it is different from the content of content unit 305b. If host computer 105 subsequently issues a read request 307 for content unit "ABC," the content unit that is returned will be different depending on whether cluster 303a processes the read request or cluster 303b processes the read request.

Figure 4:
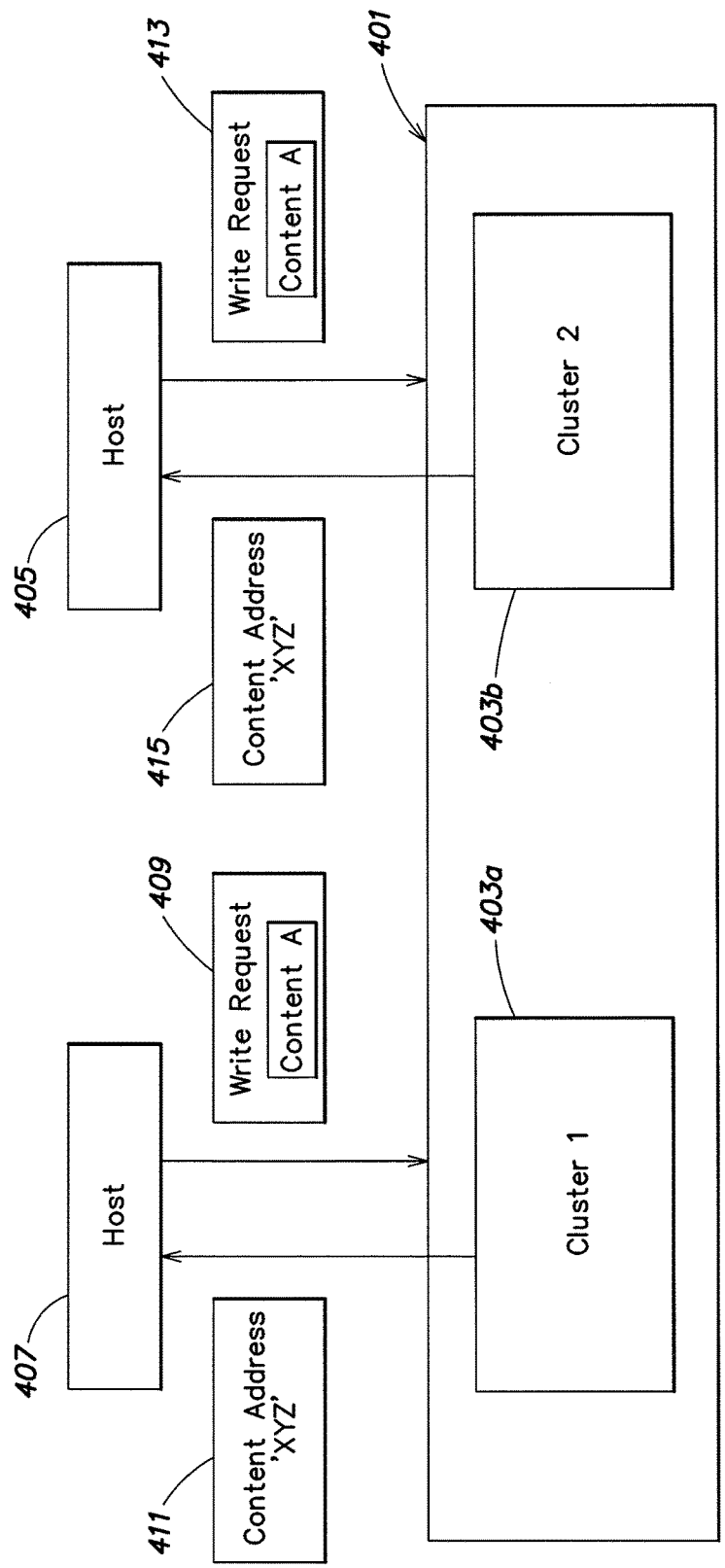
FIG. 4 is a block diagram of multiple host computers writing the same content to a storage environment having multiple clusters.

There are a number of possible ways in which two content units having the same content and the same identifier may be stored on different clusters in the same storage environment. One example is shown in FIG. 4. In FIG. 4, storage environment 401 is a CAS storage environment that includes cluster 403a and cluster 403b. Each of these clusters may be implemented as a distributed CAS storage system. Host computer 407 may issue a write request 409 to store Content A in the storage environment. Write request 409 may be processed by cluster 403a. Cluster 403a may store Content A thereon and may generate a content address for Content A by applying a hash function to the content address. In the example of FIG. 4, the content address that is generated and used to identify Content A is "XYZ." Cluster 403a may return an acknowledgment 411 to host 407 that indicates that Content A was successfully stored and may include the content address for Content A in the acknowledgment. Host computer 405 may subsequently issue a write request 413 to store the same content, Content A, in storage environment 401. However, write request 413 may be processed by cluster 403b. Cluster 403b may process the write request, generate a content address for Content A, and return acknowledgment 415 to host 405 that indicates the content address for Content A. Because cluster 403b uses the same hashing algorithm to generate the content address for Content A that was used by cluster 403a, it generates the same content address (i.e., "XYZ") for Content A that was generated by cluster 403a. Consequently, a copy of Content A is stored on both cluster 1 and cluster 2, and each copy is identified using the same identifier Another possible way in which two content units having the same content and the same identifier may be stored on different clusters in the same storage environment is if two clusters that were initially configured as a replication pair are reconfigured as co-clusters in a storage environment. A replication pair is a pair of storage clusters in which one cluster serves as a primary cluster and the other storage cluster serves as a backup cluster to the primary cluster. Content units stored on the primary cluster are replicated to the backup cluster. In this way, if a content unit becomes lost or corrupted on the primary cluster or the primary cluster fails, its content may be recovered from the backup cluster. Because the backup cluster stores copies of the content units stored on the primary cluster, if the primary cluster and backup cluster are reconfigured so that they are no longer a replica pair but rather are co-clusters in a storage environment, these two clusters may store copies of the same content units that are identified by the same identifier.

A third possible way in which two content units having the same content and the same identifier may be stored on different clusters in the same storage environment is if a restore operation is run between two clusters in a storage environment. This may occur, for example, if a system administrator accidentally runs the restore operation, or intentionally runs the restore operation without fully appreciating the consequences. A restore operation is an operation that is used to recover, from a backup cluster, content units that were stored on a primary cluster that have become lost (e.g., due to hardware failure on the cluster or some other reason) or corrupted. The restore operation copies content units from the backup cluster to a different cluster. If a restore operation is run between two clusters in the storage environment, content units stored on one cluster may be copied to the other cluster, resulting in identical copies of content units that have the same identifier being stored on different clusters in the storage environment.

When two or more copies of the same content unit that have the same identifier are stored on different clusters in a storage environment, the content of these copies may become inconsistent with each other in a number of possible ways.

For example, many storage systems allow users to modify previously stored content. For example, if it is desired to modify the content of a content unit, a write request to write to the content may be sent to and processed by the storage system. In a multi-cluster storage environment, if two copies of a content unit are stored on two different storage clusters in the storage environment, and a user request to modify the content unit is processed by only one cluster, the two copies of the content unit may become inconsistent. As a result, if a user subsequently issues a read request for the content unit, the content that the user receives in response to the request depends on which cluster processes the read request.

Some storage systems do not allow users to modify previously-stored content units. That is, once a content unit is stored on the storage system, users are not permitted to modify its content. Such content systems are sometimes referred to as archive storage systems or fixed content storage systems.

Even in storage systems that do not permit a content unit to be modified once it has been stored, it is possible that the content of two different copies of the same content unit stored on different clusters may become inconsistent.

One way in which this may occur is in a CAS storage environment in which a blob/CDF architecture is used. A unit of data in the architecture defined in the CAS applications is referred to as a blob. A blob may be, for example, the binary data created by a user or an application program to be stored on a storage system, such as, for example, a patient x-ray, company financial records, a digital image, or any other type of data. When a blob is stored to a CAS system, a content address is generated for the blob based upon its content in the manner discussed above.

Figure 5:
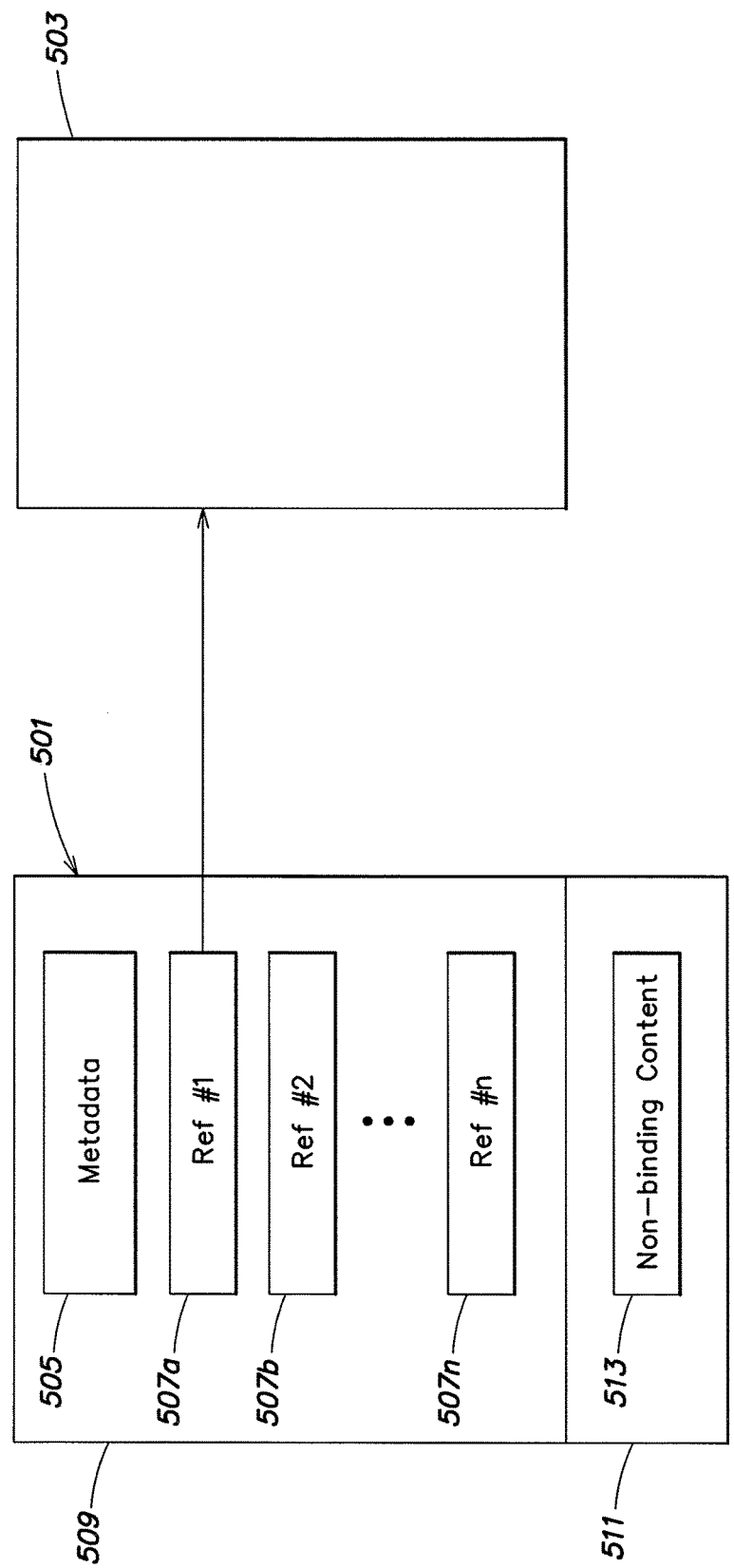
FIG. 5 is a block diagram of a blob/content descriptor file (CDF) pair.

Each blob may have at least one content descriptor file (CDF) associated with it. For example, FIG. 5 shows a blob/CDF pair comprising a CDF 501 and a blob 503. CDF 501 may include metadata 505 and a plurality of references 507a, 507b, . . . , 507n. A CDF may reference one or more blobs or CDFs. Thus, the references 507 may be, for example, references to the blobs and/or CDFs referenced by CDF 501. As shown in FIG. 5, reference 507a is a reference to blob 503. Metadata 505 may, for example, include the creation date of CDF 501 (e.g., the date that CDF 501 was initially stored), a description of the content of blob 503, other metadata pertaining to the content of blob 503, or any other suitable metadata.

Like blob 503, a content address that serves as the identifier for CDF 501 may be generated by hashing CDF 501. In this respect, CDF 501 may have a binding portion and a non-binding portion. A binding portion of a content unit is a portion that contributes to the content address for the content unit, and a non-binding portion is a portion that does not contribute to the content address for the content unit. Thus, for example, the content in the binding portion of the content unit is hashed to generate the content address, whereas the content in the non-binding portion is not hashed. For example, as shown in FIG. 5, CDF 501 has a binding portion 509 and a non-binding portion 511 which includes non-binding content 511. The content of the binding portion is input to the hashing function used to generate the content address for CDF 501, while the content of the non-binding portion is not input into the hashing function.

Because non-binding content 513 is not used in generating the content address for CDF 501, altering the content of non-binding content 513 does not change the content address for CDF 501.

A variety of types of mutable information may be stored in the non-binding portion of a CDF. For example, in FIG. 5, non-binding content 513 may include information indicating whether a litigation hold has been put on the content units referenced by references 507 of CDF 501. A litigation hold indicates that the content of the content units referenced by CDF 501 are relevant to an ongoing or anticipated litigation and, as such, CDF 501 and the content units it references cannot be deleted until the litigation hold is removed. Thus, non-binding content 513 may be altered by changing the information indicating whether a litigation hold is in place.

Another example of mutable information that may be included in non-binding content 513 is information indicating whether an event that triggers an event-based retention period has occurred. A retention period is a period during which a content unit cannot be deleted. Metadata 505 may store a retention period for CDF 501 and the content units that it references. In some situations, the length of the retention period depends on the time of occurrence of some event. For example, a hospital may have a policy that a patient's medical records are to remain stored for a minimum of five years from the patient's death. Thus, metadata 505 may store the length of the retention period (e.g., five years from patient's death), and non-binding content 513 may store information indicating whether the event upon which the length of the retention period is based has occurred and/or the time at which that event occurred. Thus, when the event occurs, information stored in non-binding content 513 may be updated to indicate that the event has occurred and/or the time at which the event occurred. This information may be used to determine when the retention period expires.

Any other type of mutable information may be stored in non-binding content such as, for example, pointers to other related content units that are stored on the CAS system.

In a multi-cluster CAS storage environment that employ a blob/CDF architecture, if two copies of a CDF are stored on different clusters in the storage environment, these two copies may be identified by the same content address, as the binding (and non-mutable) portions of these two copies are identical. If the non-binding content of one of these two CDFs changes (e.g., due to a change in litigation hold status or the occurrence of an event associated with an event based retention policy), the non-binding content of each of these two CDFs may be different, even though the content address for each of these two CDFs remains the same. Consequently, determining which copy of the CDF is the valid copy and which copy is invalid may present challenges.

Some embodiments described below are directed to addressing the above-discussed problems arising from multiple content units with different content but having the same identifier being stored on different storage clusters in a multi-cluster storage system. However, the invention is not limited to addressing any or all of the above-discussed problems. That is, while some embodiments described below may address some or all of these problems, some embodiments may not address any of these problems.

II. Techniques for Addressing Inconsistency in Content Units

A. Content Unit Deletion

In some embodiments, when two or more copies of a content unit having identical content and the same identifier are identified as being stored on different storage clusters in a multi-clustered storage environment, the duplicate copy or copies may be deleted such that the content unit is stored on only one storage cluster in the storage environment.

For example, when a user request to modify a content unit is received or when an operation that modifies the content of a content unit is to be performed, a search may be performed to determine whether there are multiple copies of the content unit stored on different clusters in the storage environment. If there are copies of the content unit stored on different clusters, the copy on one cluster may be modified and the copies on the other clusters may be deleted. In this way, there are no inconsistent copies of the content unit stored on other clusters in the storage environment.

The inventors have recognized that while this approach reduces the likelihood that multiple inconsistent content units having the same identifier are stored on different clusters in a storage environment, this approach may not be suitable for some storage environments. That is, some storage environments may enforce a retention policy that does not permit the deletion of content units or requires that content units be retained at least for some minimum period of time. Such policies may be implemented, for example, to comply with legal requirements related to the storage of certain types of data. Thus, even if the content of two duplicate content units becomes inconsistent, the retention policy of the storage environment may not permit deletion of one of those content units.

B. Parallel Modification of Content Units

In some embodiments, when two or more copies of a content unit having identical content and the same identifier are identified as being stored on different storage clusters in a multi-clustered storage environment, the content of each copy may be modified in parallel such that the content of each content unit stays consistent.

For example, when a user request to modify a content unit is received or when an operation that modifies the content of a content unit is to be performed, a search may be performed to determine whether there are multiple copies of the content unit stored on different clusters in the storage environment. If there are copies on different clusters, the modification to the content may be performed on each copy. In this manner, a content unit stored on one cluster may be consistent with copies of the content unit stored on other clusters.

The inventors have recognized that while this approach reduces the likelihood that multiple inconsistent content units having the same identifier are stored on different clusters in a storage environment, situations may still arise in which such copies may be stored on different clusters in a storage environment. For example, if two copies of a content unit are stored on two different clusters in a storage environment, and an operation to modify the content of the content unit is to be performed, a situation may arise in which one cluster is down (e.g., due to a hardware or other type of failure) at the time the operation to modify the content is to be performed. As such, it cannot be determined whether the failed cluster stores a copy of the content unit to be modified. Consequently, the operation to modify the content unit may be performed on the copy stored on one cluster, but not on the copy stored on the failed cluster. If the failed cluster later comes back online, the copy stored on this cluster will be different from and inconsistent with the copy that was modified.

C. Marking Content Units

In some embodiments, when two or more copies of a content unit having identical content and the same identifier are identified as being stored on different storage clusters in a multi-clustered storage environment, one cluster may be deemed as storing the valid copy and the other cluster(s) may be deemed as storing the invalid copy or copies. Information may be stored in the invalid copy or copies of the content unit that identifies or "marks" these copies as being invalid.

For example, when a request to modify a content unit is received or an operation that modifies the content of a content unit is to be performed, it may be determined whether multiple copies of the content unit are stored on different clusters. If multiple copies are stored on different clusters, one copy may deemed to be the valid copy and the other copy or copies may be deemed to be invalid copies. The modification operation may be performed on the valid copy and the invalid copies may be modified to include information identifying or marking these copies as being invalid. As such, when a subsequent request to read the content unit is received, each cluster may determine whether it stores a copy of the content unit, and each cluster that stores a copy of the content unit may determine whether its copy of the content unit is valid by determining whether the content unit includes information identifying it as invalid. The valid copy of the content unit may be returned in response to the read request. Similarly, when a subsequent request to modify a content unit is received, each cluster may determine whether it stores a copy of the content unit, and each cluster that stores a copy of the content unit may determine whether its copy of the content unit is valid. The valid copy of the content unit may be modified, while the invalid copies are not updated.

Figure 6:
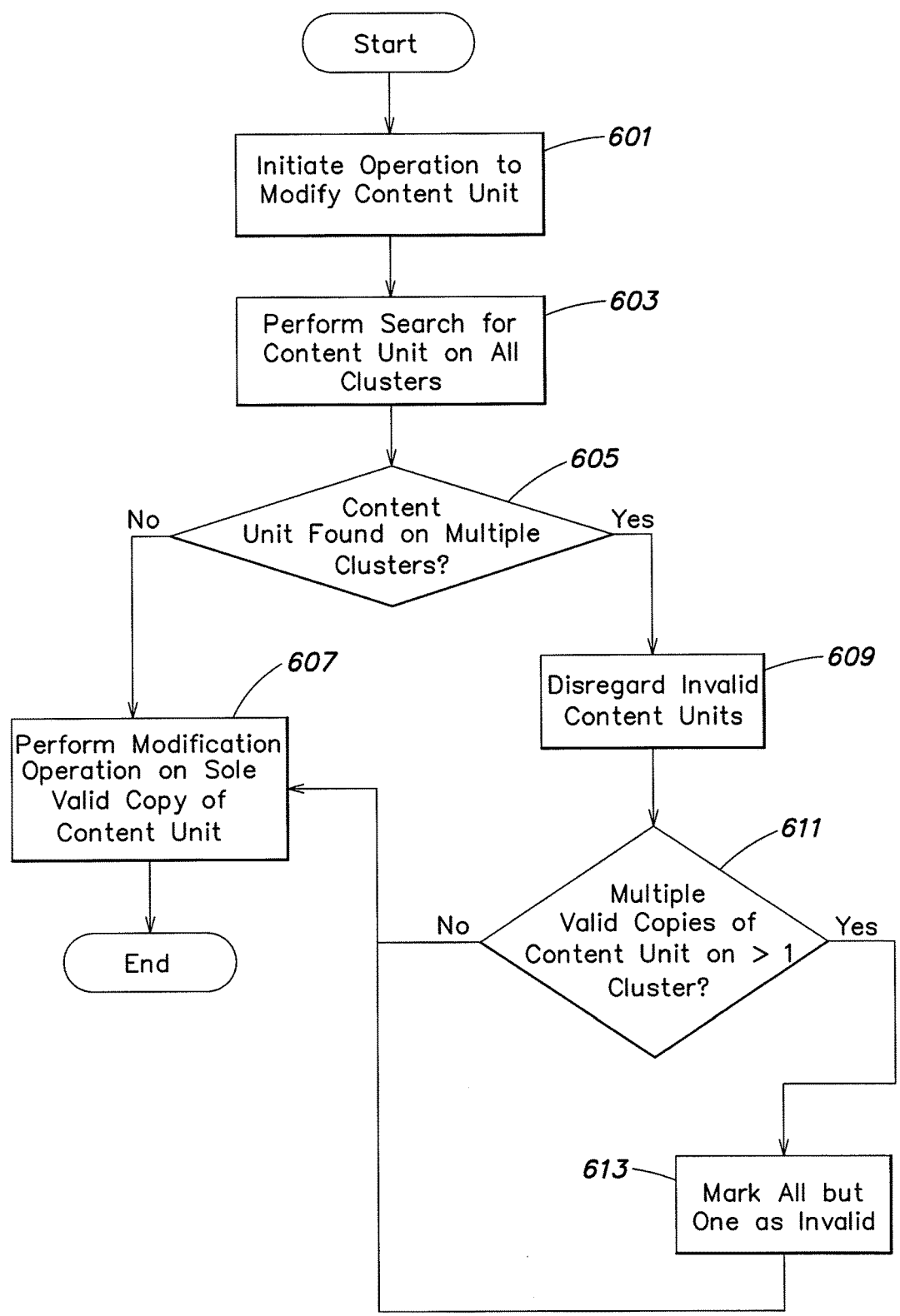
FIG. 6 is a flow chart of an illustrative process for modifying a content unit stored on multiple clusters in a storage environment by marking unmodified copies as invalid, in accordance with some embodiments.

FIG. 6 shows an illustrative process that may be used in some embodiments to modify a content unit in a multi-cluster storage environment and to identify the valid copy of such a content unit when multiple copies exist.

The process begins at act 601, where an operation to modify a content unit is initiated. The process next continues to act 603, where a search for the content unit to be modified is performed one each cluster. The process then continues to act 605, where it is determined, based on the searches in act 603, whether the content unit to be modified is stored on multiple clusters. If the content unit is not stored on multiple clusters, then the one storage cluster that stores the content unit is deemed to store the valid copy and the process continues to act 607, where the cluster that stores the content unit performs the modification operation on the content unit.

If, at act 605, it is determined that the content unit is stored on multiple clusters, the process continues to act 609, where any copies of the content unit that include information marking those content units as invalid are disregarded. The process next continues to act 611, where it is determined whether there are multiple copies of the content unit that are not marked as invalid stored on more than one cluster. If it is determined that there are not, the process continues to act 607, where the cluster that stores the sole valid copy of the content unit performs the modification operation on that content unit. If, at act 611, it is determined that there are multiple copies of content units that are not marked as invalid, the process continues to act 613 where information is stored in all but one of these content units that indicates or marks the content unit as being invalid. In this way, one cluster is selected as storing the valid copy of the content unit, and the other clusters are deemed to store invalid copies. The selection of the cluster that stores the valid copy may be made in any of a variety of ways. For example, the cluster on which the content unit was most recently stored may be selected as storing the valid copy or the cluster that has the most available storage capacity may be selected as storing the valid copy. Any other suitable criterion or criteria may be used to select a cluster as storing the valid copy, as the invention is not limited in this respect. After act 613, the process continues to act 607, where the cluster that stores the valid copy of the content unit performs the modification operation on the content unit.

Figure 7:
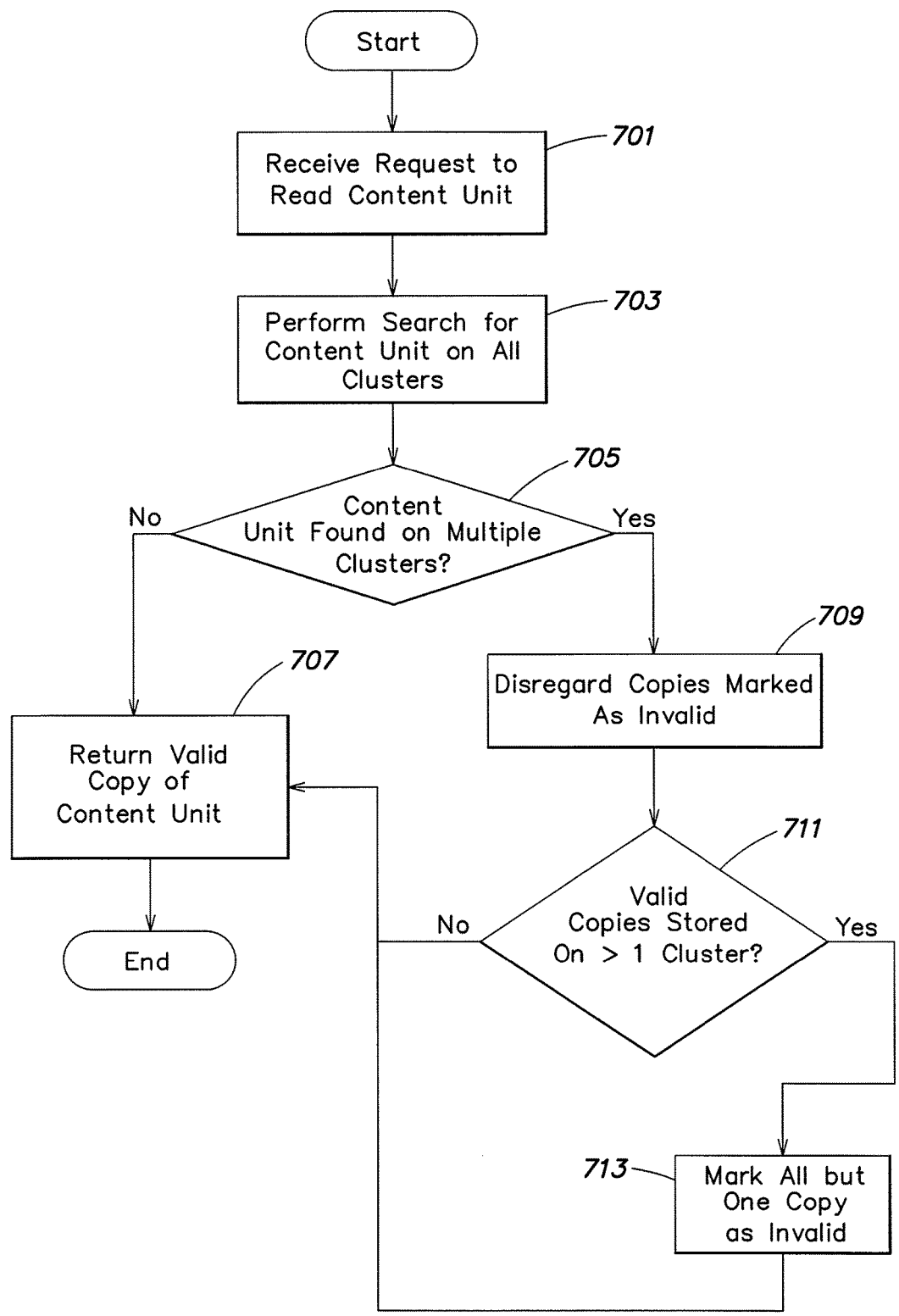
FIG. 7 is a flow chart of an illustrative process for reading a content unit stored on multiple clusters in a storage environment in which copies marked as invalid are disregarded, in accordance with some embodiments.

FIG. 7 shows an illustrative process that may be used in some embodiments to read a content unit in a multi-cluster storage environment and to identify the valid copy of such a content unit when multiple copies exist.

The process begins at act 701, where a request to read a content unit is received. Such a request may be received from, for example, a host computer or an application program executing on a host computer.

The process next continues to act 703, where a search for the content unit to be read is performed one each cluster. The process then continues to act 705, where it is determined, based on the searches in act 703, whether the content unit to be read is stored on multiple clusters. If the content unit is not stored on multiple clusters, then the one storage cluster that stores the content unit is deemed to store the valid copy and the process continues to act 707, where the content unit is returned from the cluster that stores it.

If, at act 705, it is determined that the content unit is stored on multiple clusters, the process continues to act 709, where any copies of the content unit that include information marking those content units as invalid are disregarded. The process next continues to act 711, where it is determined whether there are multiple copies of the content unit that are not marked as invalid stored on more than one cluster. If it is determined that there are not, the process continues to act 707, where the sole valid copy of the content unit is returned in response to the read request received in act 701. If, at act 711, it is determined that there are multiple copies of content units that are not marked as invalid, the process continues to act 713 where information is stored in all but one of these content units that indicates or marks the content unit as being invalid. In this way, one cluster is selected as storing the valid copy of the content unit, and the other clusters are deemed to store invalid copies. The selection of the cluster that stores the valid copy may be made in any of a variety of ways. For example, the cluster on which the content unit was most recently stored may be selected as storing the valid copy or the cluster that has the most available storage capacity may be selected as storing the valid copy. Any other suitable criterion or criteria may be used to select a cluster as storing the valid copy, as the invention is not limited in this respect. After act 713, the process continues to act 707, where the content unit is returned from the cluster that stores it.

D. New Content Unit Creation

In some embodiments, when two or more copies of a content unit having identical content and the same identifier are identified as being stored on different storage clusters in a multi-clustered storage environment, a new content unit, referred to herein as a status content unit, may be created. Information may be stored in the status content unit that indicates that there are multiple copies of the content unit stored on different clusters, and may indicate which copy is the valid, on which cluster the valid copy is stored, which copy or copies are invalid and on which cluster(s) the invalid copy or copies is stored.

For example, when a request to modify a content unit is received or an operation that modifies the content of a content unit is to be performed, it may be determined whether multiple copies of the content unit are stored on different clusters. If multiple copies are stored on different clusters, one copy may deemed to be the valid copy and the other copy or copies may be deemed to be invalid copies. The modification operation may be performed on the valid copy and a status content unit may be stored on each cluster that stores a copy of the content unit indicating where each copy of the content unit is stored and which copy is the valid copy. As such, when a subsequent request to read the content unit is received, each cluster may determine whether it stores a copy of the content unit, and each cluster that stores a copy of the content unit may determine whether its copy of the content unit is valid by locating the status content unit and analyzing the information stored therein. The valid copy of the content unit may be returned in response to the read request. Similarly, when a subsequent request to modify a content unit is received, each cluster may determine whether it stores a copy of the content unit, and each cluster that stores a copy of the content unit may determine whether its copy of the content unit is valid by locating the status content unit and analyzing the information stored therein. The valid copy of the content unit may be modified, while the invalid copies are not updated.

Figure 8A:
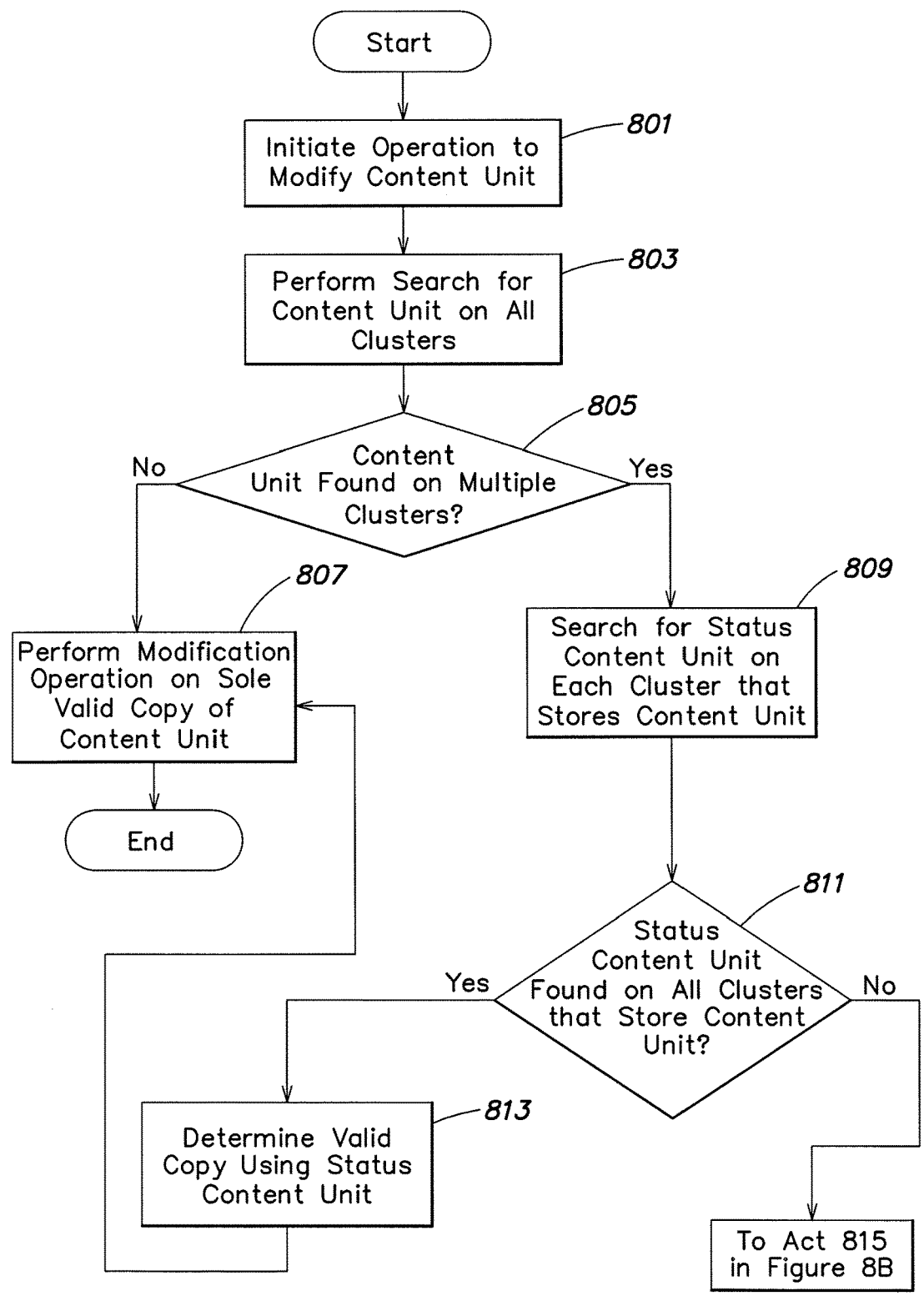
FIGS. 8A and 8B are a flow chart of an illustrative process for modifying a content unit stored on multiple clusters in a storage environment in which a new content unit is created to identify the valid copy, in accordance with some embodiments.
Figure 8B:
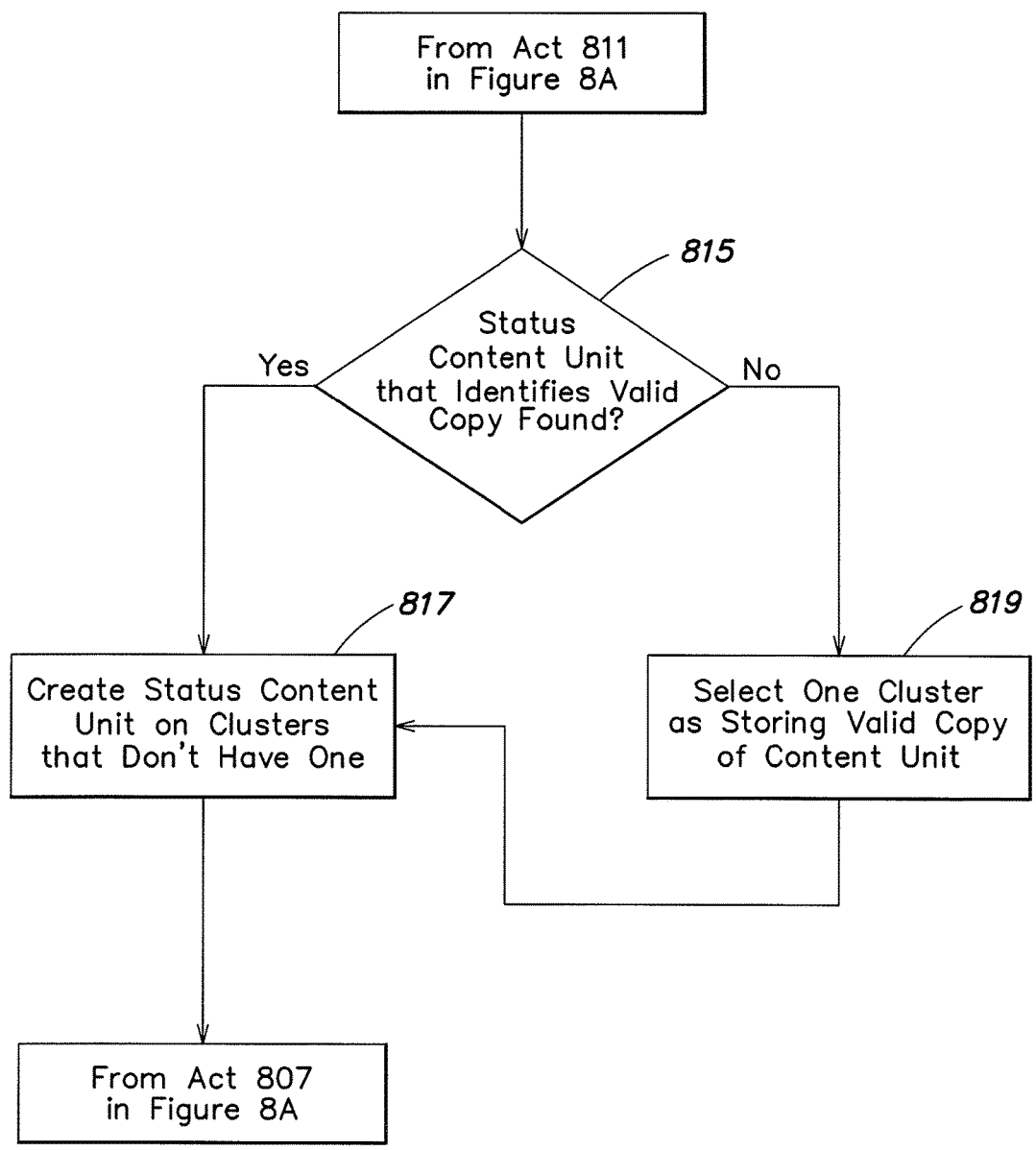

FIG. 8 shows an illustrative process that may be used in some embodiments to modify a content unit in a multi-cluster storage environment and to identify the valid copy of such a content unit when multiple copies exist. The process begins at act 801, where an operation to modify a content unit is initiated. The process next continues to act 803, where a search for the content unit to be modified is performed one each cluster. The process then continues to act 805, where it is determined, based on the searches in act 803, whether the content unit to be modified is stored on multiple clusters. If the content unit is not stored on multiple clusters, then the one copy of the content unit that exists in the storage environment is deemed to be the valid copy and the process continues to act 807, where the cluster that stores the content unit performs the modification operation on the content unit.

If, at act 805, it is determined that the content unit is stored on multiple clusters, the process continues to act 809, where a search for a status content unit associated with the content unit is performed on each cluster that stores a copy of the content unit. The process next continues to act 811, where it is determined whether a status content unit associated with the content unit to be modified is stored on each cluster that stores a copy of the content unit to be modified. If it is determined that such a status content unit is stored on each cluster that stores a copy of the content unit, the process continues to act 813, where the information in these status content units is used to determine which copy is the valid copy. The process then continues to act 807, where the modification operation is performed on the valid copy of the content unit.

If, at act 811, it is determined that each cluster that stores a copy of the content unit to be modified does not store a status content unit associated with that content unit, the process continues to act 815, where it is determined if a status content unit was located that identifies which copy of the content unit to be modified is the valid copy. If it is determined that such a status content unit was located, the process continues to act 817, where a status content unit is created and stored on each cluster that stores the content unit but does not store a status content unit for the content unit. The status content unit may indicate on which cluster the valid copy of the content unit is stored and/or on which cluster(s) the invalid copy or copies of the content unit is/are stored. The process then continues to act 807, where the modification operation is performed on the valid copy of the content unit.

If, at act 815, it is determined that no status content unit was located that identifies which copy of the content unit to be modified is the valid copy, the process continues to act 819, where one cluster is selected as storing the valid copy. This selection may be made in any of a variety of ways. For example, the cluster on which the content unit was most recently stored may be selected as storing the valid copy or the cluster that has the most available storage capacity may be selected as storing the valid copy. Any other suitable criterion to select a cluster as storing the valid copy may be employed, as the invention is not limited in this respect. Once one cluster is selected as storing the valid copy, the process continues to act 817, where a status content unit is created and stored on each cluster that stores the content unit but does not store a status content unit for the content unit. The status content unit may indicate on which cluster the valid copy of the content unit is stored and/or on which cluster(s) the invalid copy or copies of the content unit is/are stored. The process then continues to act 807, where the modification operation is performed on the valid copy of the content unit.

Figure 9A:
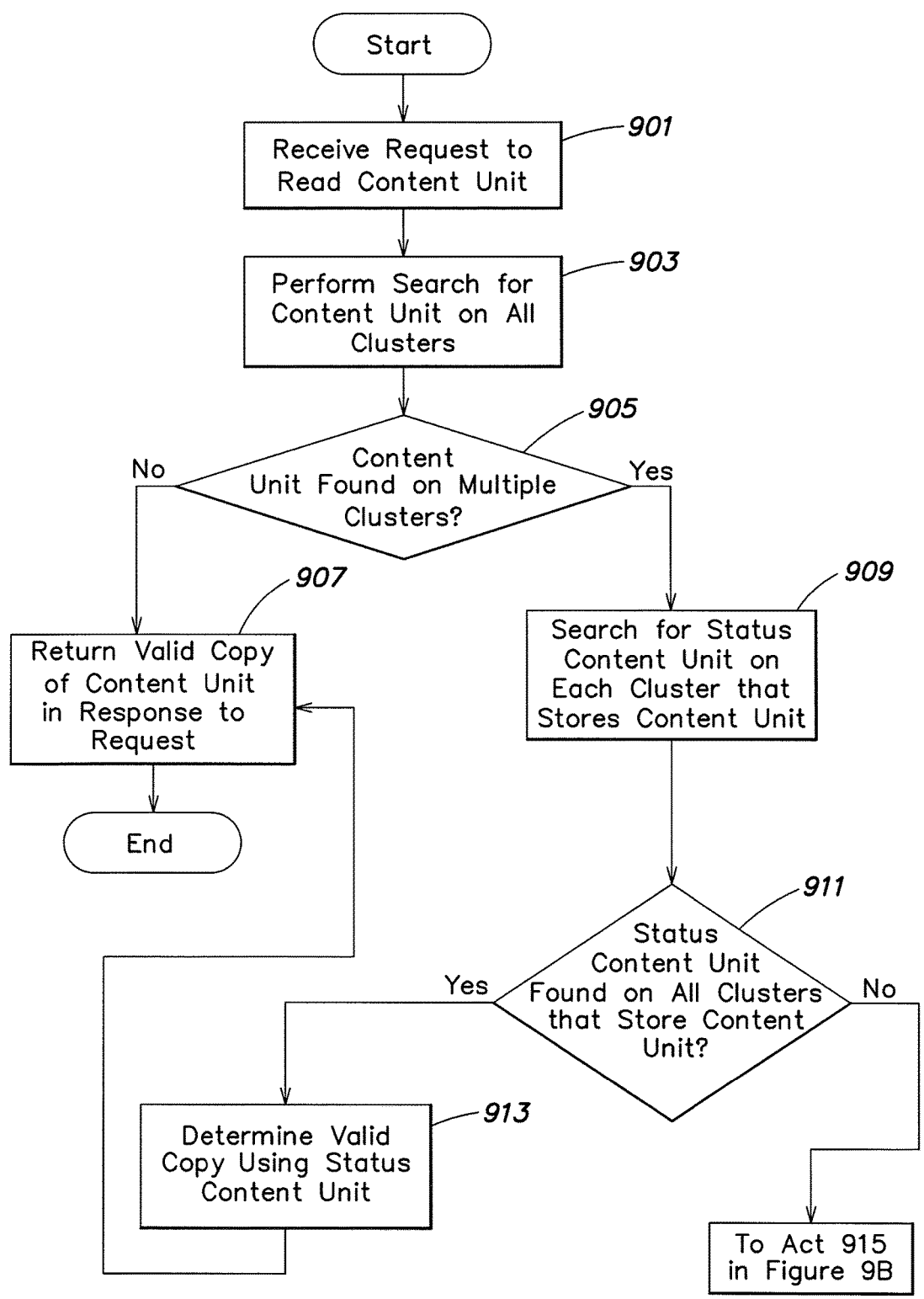
FIGS. 9A and 9B are a flow chart of an illustrative process for reading a content unit stored on multiple clusters in a storage environment in which the valid copy is determined from a status content unit, in accordance with some embodiments.
Figure 9B:
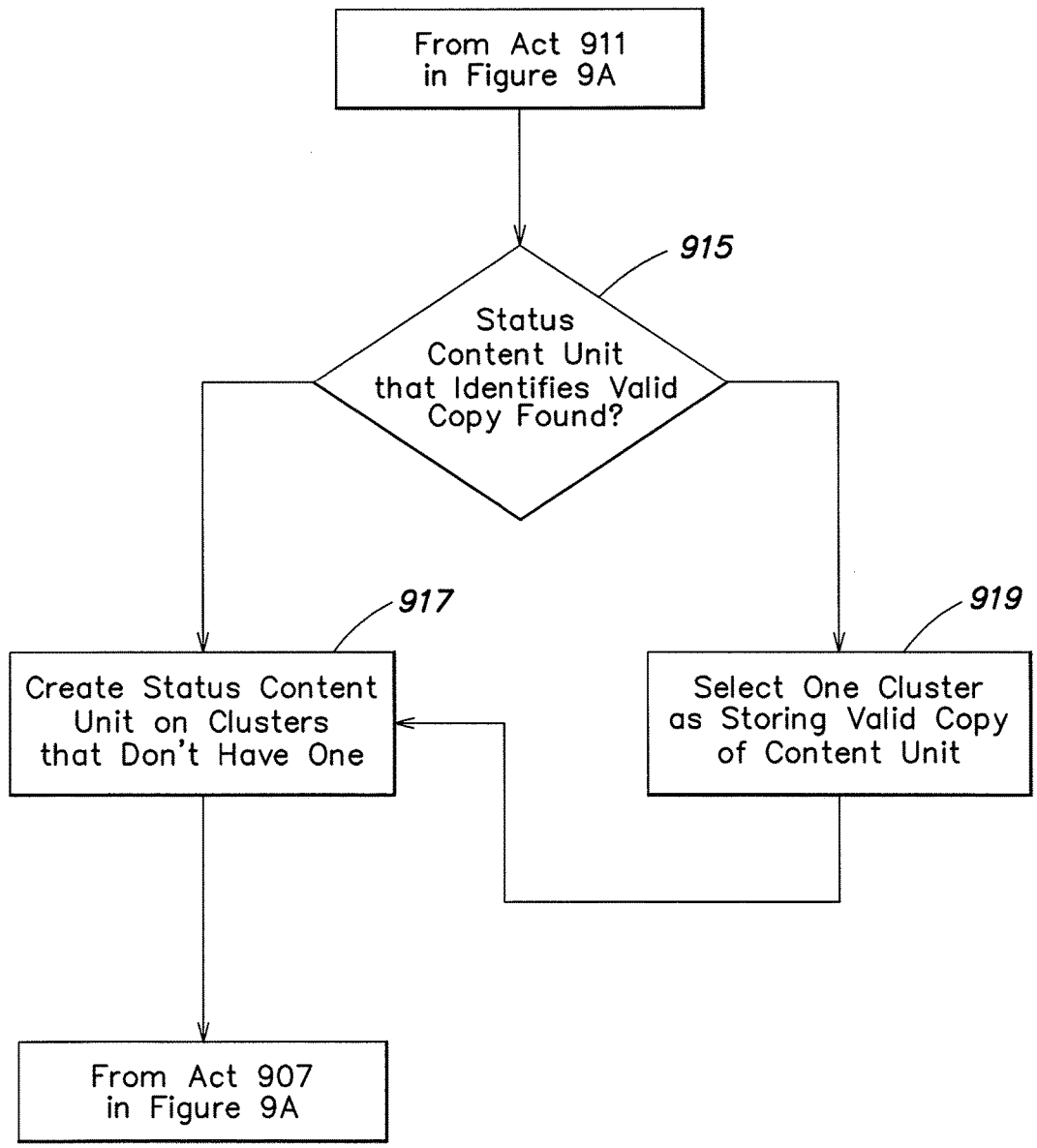

FIG. 9 shows an illustrative process that may be used in some embodiments to read a content unit in a multi-cluster storage environment and to identify the valid copy of such a content unit when multiple copies exist.

The process begins at act 901, where a request to read a content unit is received in the storage environment. Such a request may be received from, for example, a host computer or an application program executing on a host computer.

The process next continues to act 903, where a search for the content unit to be read is performed one each cluster. The process then continues to act 905, where it is determined, based on the searches in act 903, whether the content unit to be read is stored on multiple clusters. If the content unit is not stored on multiple clusters, then the process continues to act 907, where the content unit is read from the one cluster in the storage environment that stores it, and the content unit is returned to the requesting entity in response to the request.

If, at act 905, it is determined that the content unit is stored on multiple clusters, the process continues to act 909, where a search for a status content unit associated with the content unit is performed on each cluster that stores a copy of the content unit. The process next continues to act 911, where it is determined whether a status content unit associated with the content unit to be read is stored on each cluster that stores a copy of the content unit to be read. If it is determined that such a status content unit is stored on each cluster that stores a copy of the content unit, the process continues to act 913, where the information in these status content units is used to determine which copy is the valid copy. The process then continues to act 907, where the valid copy of the content unit is read from the cluster that stores it, and the content unit is returned to the requesting entity in response to the request.

If, at act 911, it is determined that each cluster that stores a copy of the content unit to be read does not store a status content unit associated with that content unit, the process continues to act 915, where it is determined if a status content unit was located that identifies which copy of the content unit to be read is the valid copy. If it is determined that such a status content unit was located, the process continues to act 917, where a status content unit is created and stored on each cluster that stores the content unit but does not store a status content unit for the content unit. The status content unit may indicate on which cluster the valid copy of the content unit is stored and/or on which cluster(s) the invalid copy or copies of the content unit is/are stored. The process then continues to act 907, where the valid copy of the content unit is returned from the cluster that stores it to the requesting entity in response to the request.

If, at act 915, it is determined that no status content unit was located that identifies which copy of the content unit to be read is the valid copy, the process continues to act 919, where one cluster is selected as storing the valid copy. This selection may be made in any of a variety of ways. For example, the cluster on which the content unit was most recently stored may be selected as storing the valid copy or the cluster that has the most available storage capacity may be selected as storing the valid copy. Any other suitable criterion to select a cluster as storing the valid copy, as the invention is not limited in this respect. Once one cluster is selected as storing the valid copy, the process continues to act 917, where a status content unit is created and stored on each cluster that stores the content unit but does not store a status content unit for the content unit. The status content unit may indicate on which cluster the valid copy of the content unit is stored and/or on which cluster(s) the invalid copy or copies of the content unit is/are stored. The process then continues to act 907, where the valid copy of the content unit is returned from the cluster that stores it to the requesting entity in response to the request.

E. Write Timestamp Update

In some embodiments, when a cluster in a multi-cluster storage environment receives a request to read a content unit, it may return the requested content unit and additional information pertinent to the requested content unit. For example, the storage cluster may store, external to the content unit, metadata about the content unit. Such information may include, for example, information indicating the time at which the content unit was initially stored in the cluster. This time may be different from the time of creation of the content unit because the content unit may have been created outside of the cluster and moved into the cluster after its initial time of creation. The information indicating the time at which the content unit was initially stored in the cluster in which it is stored is referred to herein as the "write timestamp" for the content unit.

As indicated above, a cluster may store the write timestamp for a content unit external to the content unit, such that the write timestamp is not part of the content of the content unit. The write timestamp may be stored and associated with its content unit in any of numerous possible ways. For example, as shown in FIG. 10, in some embodiments, the write timestamp may be stored in a relational database table and associated with its content unit via the object identifier for the content unit. FIG. 10 shows an illustrative database table 1000 that stores the write timestamps for three different content units stored on a storage cluster. As shown in FIG. 10, database table 1000 includes three records 1005a, 1005b, and 1005c. Each record includes a two fields. Field 1003 is used to store the write timestamp for a content unit. Field 1001 is used to indicate the object identifier of the content unit with which the write timestamp is associated. In the example of FIG. 10, each record in table 1000 has only two fields. However, the number of fields in table 1000 is provided only for illustrative purposes, as the database table that stores the write timestamps for content units may include any suitable number of fields. In some embodiments, when a storage cluster receives a request to read a content unit (e.g., a request issued by a host computer and/or application program), the storage cluster may access the write timestamp for the content unit and return the write timestamp in response to the request.

In situations, when two or more copies of a content unit having identical content and the same identifier are identified as being stored on different storage clusters in a multi-clustered storage environment, each cluster may store a different write timestamp for the content unit because the times of storage of the content unit on the clusters in the storage environment may be different.

The inventor has appreciated that the write timestamp for a content unit may be used to indicate whether a cluster's copy of the content unit is a valid copy or an invalid copy. For example, in some embodiments, when a request to modify a content unit is received or a write operation is to be performed on the content unit, it may be determined whether multiple copies of the content unit are stored on different clusters. If multiple copies are stored on different clusters, one copy may deemed to be the valid copy and the other copy or copies may be deemed to be invalid copies. The modification operation may be performed on the valid copy and the write timestamps for the invalid copies may be set to a value that indicates that those copies are invalid. Any suitable value may be used to indicate that the content unit is invalid, as there are numerous possibilities of values to be used. For example, the binary representation of the write timestamp value may be set to all zeros or all ones to indicate that the associated content unit is invalid. As another example, the write timestamp may be set to a value indicative of a time that is so far in the future or so far in the past (e.g., a million years in the future or a million years in the past) that no write timestamps for valid content units will have that value. As used herein, the term invalid value refers to any write timestamp value that indicates that the copy of the content unit for that value is an invalid copy.

When a subsequent request to read the content unit is received, each cluster may determine whether it stores a copy of the content unit, and each cluster that stores a copy of the content unit may determine whether its copy of the content unit is valid by analyzing the write timestamp for the content unit.

The inventors have recognized that this approach provides the benefit that, because the write timestamps for content units are stored on the storage cluster and returned in response to read requests for those content units, repurposing the write timestamp to indicate whether a content unit is invalid does not necessitate using additional storage space. Moreover, because storage clusters may be configured to return the write timestamp for a content unit in response to a read request for the content unit, accessing the write timestamp to determine whether a copy of the content unit is invalid does not impose a significant additional processing burden or latency in responding to a read request for the content unit.

Figure 11:
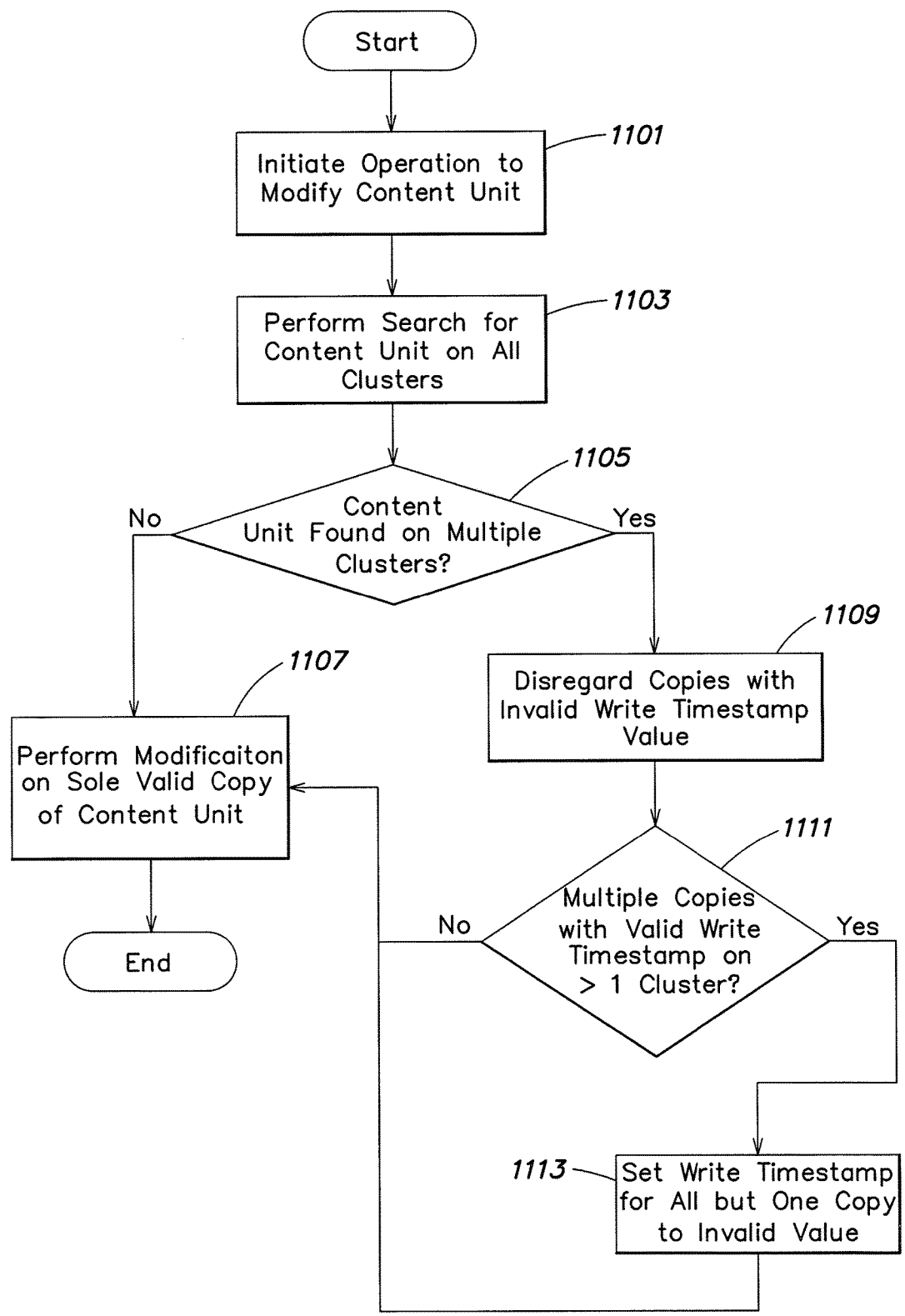
FIG. 11 is a flow chart of an illustrative process for modifying a content unit stored on multiple clusters in a storage environment, in which the write timestamp for invalid copies is used to identify those copies as invalid, in accordance with some embodiments.

FIG. 11 shows an illustrative process that may be used in some embodiments to modify a content unit in a multi-cluster storage environment and to identify the valid copy of such a content unit when multiple copies exist.

The process begins at act 1101, where an operation to modify a content unit is initiated. The process next continues to act 1103, where a search for the content unit to be modified is performed one each cluster. This may be done by issuing a read request for each content unit to each cluster. In this way, each cluster that stores a copy of the content unit may return its copy, along with the associated write timestamp for the copy. The process then continues to act 1105, where it is determined, based on the searches in act 1103, whether the content unit to be modified is stored on multiple clusters. If the content unit is not stored on multiple clusters, then the one storage cluster that stores the content unit is deemed to store the valid copy and the process continues to act 1107, where the cluster that stores the content unit performs the modification operation on the content unit.

If, at act 1105, it is determined that the content unit is stored on multiple clusters, the process continues to act 1109, where any copies of the content unit whose associated write timestamp has an invalid value is disregarded. The process next continues to act 1111, where it is determined whether there are multiple copies of the content unit stored on more than one cluster that do not have an invalid write timestamp value. If it is determined that there are not, the process continues to act 1107, where the cluster that stores the sole valid copy of the content unit performs the modification operation on that content unit. If, at act 1111, it is determined that there are multiple copies of content units whose write timestamp values are not invalid, the process continues to act 1113 where the write timestamp of all but one of these copies is set to the invalid value. In this way, one cluster is selected as storing the valid copy of the content unit, and the other clusters are deemed to store invalid copies. The selection of the cluster that stores the valid copy may be made in any of a variety of ways. For example, the cluster on which the content unit was most recently stored may be selected as storing the valid copy or the cluster that has the most available storage capacity may be selected as storing the valid copy. Any other suitable criterion or criteria may be used to select a cluster as storing the valid copy, as the invention is not limited in this respect. After act 1113, the process continues to act 1107, where the cluster that stores the valid copy of the content unit performs the modification operation on the content unit.

Figure 12:
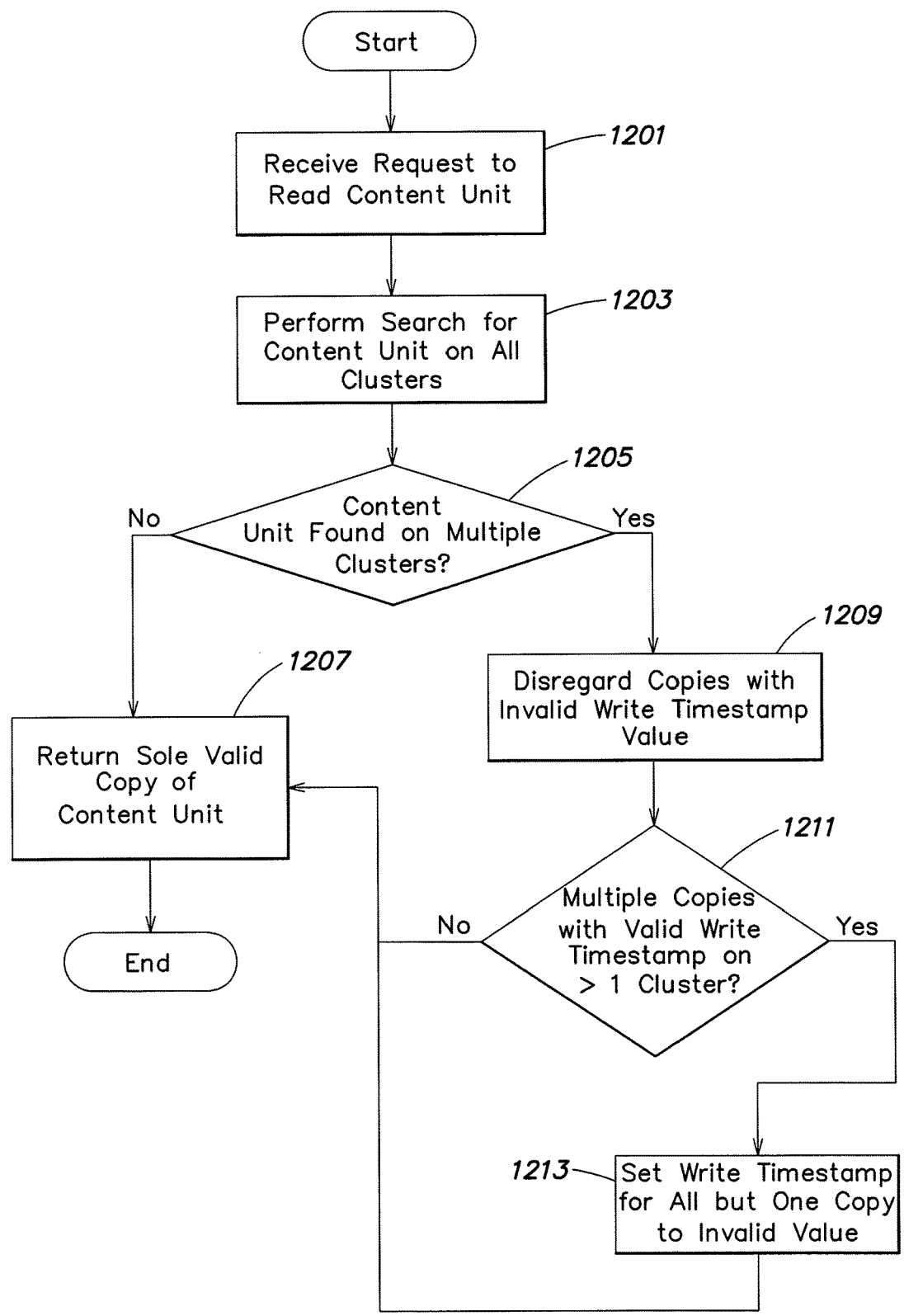
FIG. 12 is a flow chart of an illustrative process for reading a content unit stored on multiple clusters in a storage environment, in which the valid copy is determined using the write timestamps for the content units, in accordance with some embodiments.

FIG. 12 shows an illustrative process that may be used in some embodiments to read a content unit in a multi-cluster storage environment and to identify the valid copy of such a content unit when multiple copies exist.

The process begins at act 1201, where a request to read a content unit is received. Such a request may be received from, for example, a host computer or an application program executing on a host computer.

The process next continues to act 1203, where a search for the content unit to be read is performed one each cluster.

This may be accomplished, for example, by sending a read request to each cluster in the storage environment. In this way, each cluster that stores a copy of the content unit may return its copy along with the write timestamp associated with the copy.

The process then continues to act 1205, where it is determined, based on the searches in act 1203, whether the content unit to be read is stored on multiple clusters. If the content unit is not stored on multiple clusters, then the one storage cluster that stores the content unit is deemed to store the valid copy and the process continues to act 1207, where the content unit is returned from the cluster that stores it.

If, at act 1205, it is determined that the content unit is stored on multiple clusters, the process continues to act 1209, where any copies of the content unit with a write timestamp having an invalid value are disregarded. The process next continues to act 1211, where it is determined whether there are multiple copies of the content unit stored on more than one cluster whose write timestamp values are not invalid. If it is determined that there are not, the process continues to act 1207, where the sole valid copy of the content unit is returned in response to the read request in act 1201. If, at act 1211, it is determined that there are multiple copies of content units with a valid write timestamp value, the process continues to act 1213 where the write timestamp for all but one of the copies of the content unit is updated to the invalid value. In this way, one cluster is selected as storing the valid copy of the content unit, and the other clusters are deemed to store invalid copies. The selection of the cluster that stores the valid copy may be made in any of a variety of ways. For example, the cluster on which the content unit was most recently stored may be selected as storing the valid copy or the cluster that has the most available storage capacity may be selected as storing the valid copy. Any other suitable criterion or criteria may be used to select a cluster as storing the valid copy, as the invention is not limited in this respect. After act 1113, the process continues to act 1107, where the valid copy of the content unit is returned in response to the read request in act 1201.

The above-described techniques for using write timestamp values to indicate whether a cluster's copy of the content unit is a valid copy or an invalid copy provide the benefit of an unambiguous answer as to which copy is the valid copy and which copy is invalid. Thus, for example, using this technique, each time a content unit that is stored on two different clusters of a federation is read, the same copy of the content unit would be identified as being the valid copy and the other copy or copies would be identified as being invalid. This is because, if the write timestamps for all but one of the copies are set to the invalid value, each read request for the content unit would result in the one of the copies with the valid write timestamp value being identified as the valid copy. In cases where there are multiple copies of a content unit stored on different clusters of a federation and more than one have a valid write timestamp value, the same content unit would be identified as the valid copy each time a read request for the content unit is received, because each user uses the same algorithm to determine, based at least in part on the value of the write timestamp, which copy of multiple copies that have a valid write timestamp value is the valid one. Thus, for example, if two users were to simultaneously issue requests for the content unit, each user would identify the same copy of the content unit as being the valid one because each user would apply the same algorithm, based at least in part on the write timestamp values of the multiple copies, to determine which copy is valid.

III. Replication

As discussed above, in some situations it may be desired to replicate content units stored in a primary storage environment to a secondary backup storage environment, so that if a failure occurs that causes content units stored on the primary storage environment to become lost, corrupted, or temporarily unavailable, the content units may be recovered from the backup storage environment.

Figure 13:
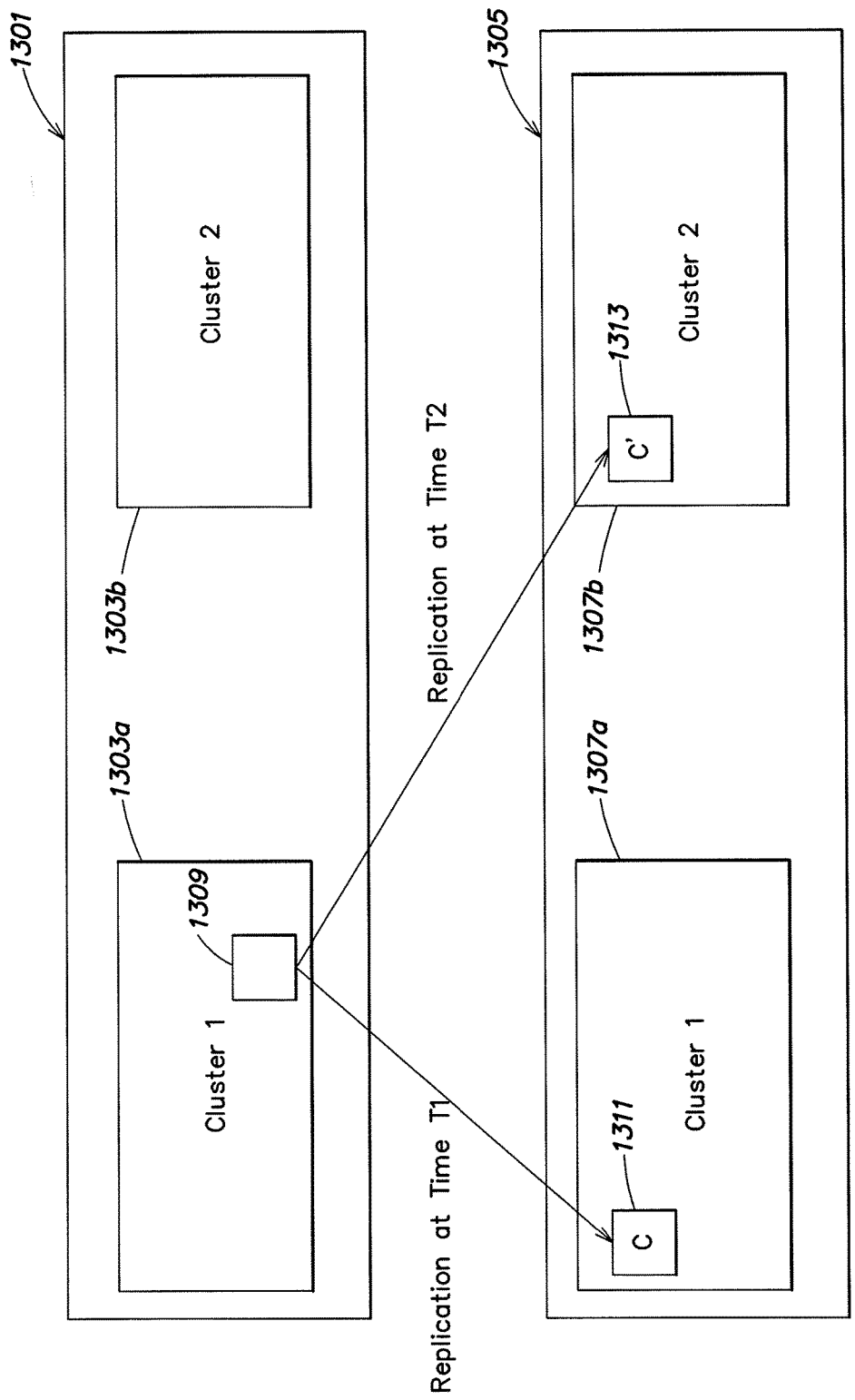
FIG. 13 is a diagram of a primary storage environment having multiple clusters and a backup storage environment having multiple cluster and serving as a replication target for the primary storage environment.

The inventor has appreciated that, when replicating content units from a primary multi-cluster storage environment to a backup multi-cluster storage environment, situations may arise in which inconsistent copies of a content unit having the same identifier are stored on different storage clusters in the backup storage environment. For example, FIG. 13 shows a primary storage environment 1301 having clusters 1303a and 1303b and a backup storage environment 1305 having storage clusters 1307a and 1307b. In the example of FIG. 13, storage cluster 1303a stores a content unit 1309, which is replicated to cluster 1311 at time T1 and is replicated to cluster 1307b at a later time T2. If the content of content unit 1309 were modified in between time T1 and time T2 (e.g., in any of the manners discussed above) the content of content units 1311 and 1313 may be inconsistent. Thus, if it is ever desired to restore the content unit from the backup storage environment (e.g., if cluster 1303a experiences a failure), determining which copy of the content unit is the valid one and/or which copy to restore to the primary storage environment may present challenges.

Another situation in which inconsistent copies of a content unit may be stored on different storage clusters in a backup storage environment is if a content unit on a first cluster in the primary storage environment is replicated to a first cluster in a backup storage environment. If the content unit in the primary storage environment is subsequently moved to a second cluster in the primary storage environment, this second cluster may be unaware that the content unit has already been replicated to the backup storage environment and may replicate the content unit to a second cluster in the backup storage environment. If the content of the content unit was modified in between the two replications, then the replica copies of the content unit stored on the first and second clusters of the backup storage environment may be inconsistent.

One technique for reducing the likelihood that inconsistent copies of a content unit having the same identifier may be replicated to different storage clusters in a backup storage environment is to, prior to replicating the content unit, perform a search for the content unit on each cluster in the backup storage environment to determine whether one of these clusters already stores the content unit. If so, then the content unit may be replicated to the cluster that already stores it, so that it replaces the previously-replicated copy of the content unit on that cluster. The inventor has recognized that this technique involves inefficiencies in that, in order to replicate a content unit, a search for the content unit is performed on each cluster in the backup storage environment. Performing this global search increases the latency in replicating a content unit and consumes processing resources on the clusters in the backup storage environment.

Thus, in some embodiments, the primary storage environment may be configured to apply a standard replication policy that specifies to which cluster in a backup storage environment a content unit is to be replicated based on some unchanging attribute of the content unit. For example, the replication policy may specify to which cluster a content unit is to be replicated based on the object identifier of the content unit. As one possible example, if the backup storage environment has two clusters, the replication policy may specify that content units with even object identifiers (i.e., object identifiers whose binary value is an even value) are replicated to cluster 1 in the backup storage environment and content units with odd object identifiers (i.e., object identifiers whose binary value is an odd value) are replicated to cluster 2 in the backup storage environment. In this way, a global lookup need not be performed to determine to whether and to which storage cluster a content unit has been replicated, as this may be determined using the storage policy.

The inventor has recognized that, in some situations, such a replication policy may be put in place after a storage environment has been in use for some period of time and has replicated some content units to a backup storage environment. In such situations, a global lookup may be performed for content units created before the replication policy was put in place, and the replication policy may be applied to determine where content units created after the replication policy was put in place would have been replicated.

Figure 14:
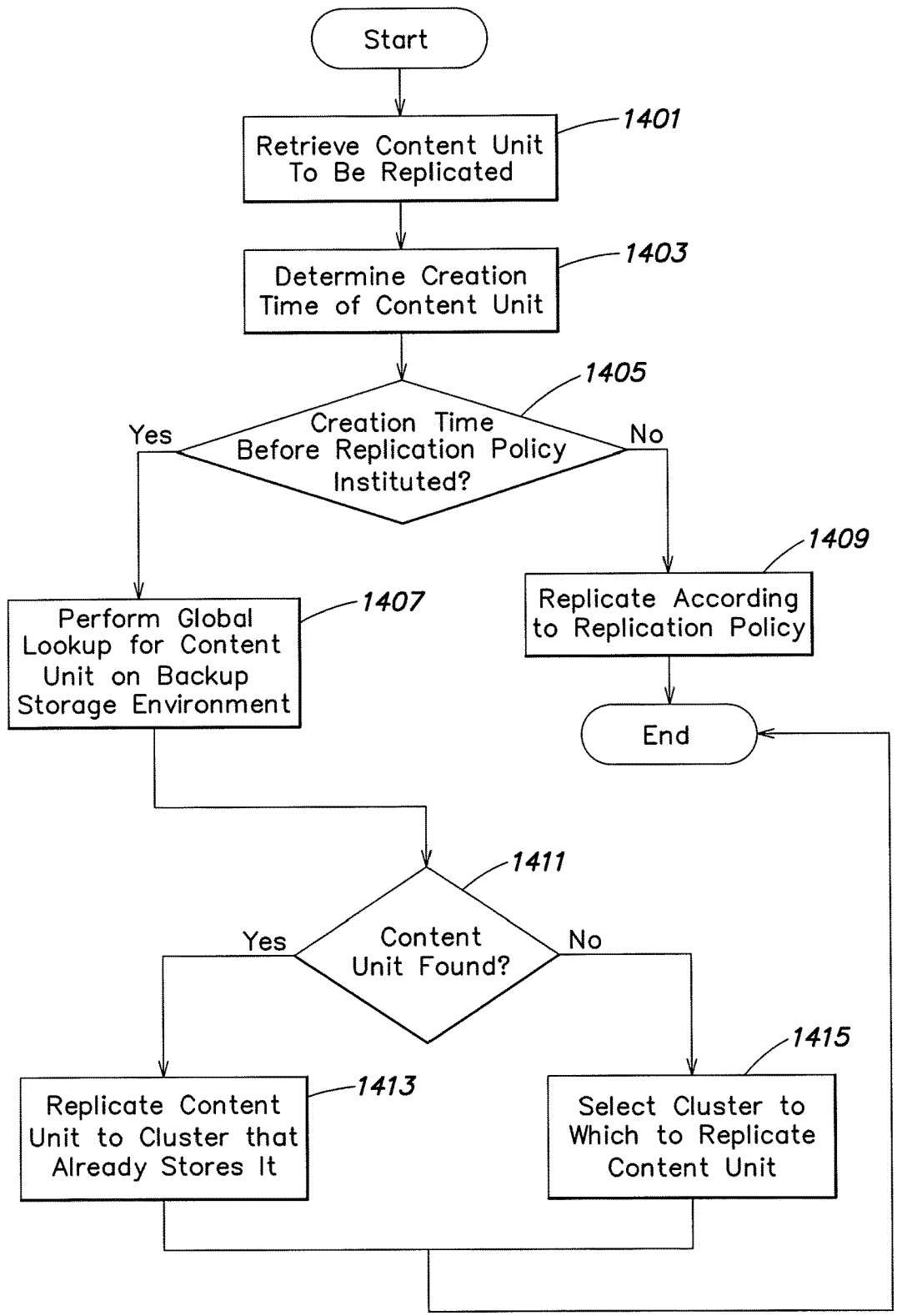
FIG. 14 is a flow chart of an illustrative process for replicating a content unit from a primary storage environment to a backup storage environment, in accordance with some embodiments.

FIG. 14 shows a flow chart of a process that may be performed by a cluster in a primary storage environment to replicate a content unit to a backup storage environment that that cluster has not previously replicated to the backup storage environment. The process begins at act 1401, where a content unit that is to be replicated is retrieved. The process next continues to act 1403, where the time of creation of the content unit to be replicated is determined. The time of creation of the content unit may be determined in any suitable way. For example, the time of creation may be stored in the content of the content unit or may be stored externally, as metadata associated with the content unit. In this respect, it should be appreciated that the creation time of the content unit is different from the above-discussed write timestamp. That is, the creation time of the content unit indicates the time at which the content unit was initially created, whereas the write timestamp for the content unit indicates the time at which the content unit was first stored in the storage cluster in which it is stored.

Once the creation time of the content unit is determined, the process continues to act 1405, where it is determined whether the content unit was created before the replication policy was instituted. If it is determined that the content unit was created after the replication policy was instituted, then the process continues to act 1409, where the content unit is replicated to the storage cluster in the backup storage environment specified by the replication policy. In this way, if another cluster in the primary storage environment has already replicated the content unit to the backup storage environment, then the replication performed at act 1409 will cause the previously-replicated content unit to be replaced with the content unit to be replicated.

If, at act 1405, it is determined that the content unit to be replicated was created before the replication policy was instituted, the process continues to act 1407, where a search for the content unit is performed on each cluster in the backup storage environment. The process next continues to act 1411, where it is determined if the content unit was found on any of the clusters in the backup storage environment. If the content unit was found on one of the storage clusters, the process continues to act 1413, where the content unit to be replicated is replicated to the storage cluster that already stores the content unit (i.e., such that the previously-stored copy is replaced). If the content unit was not found on any of the clusters in the backup storage environment, the process continues to act 1415, where one cluster is selected to store the replicated content unit and the content unit is replicated to that cluster.

Figure 15:
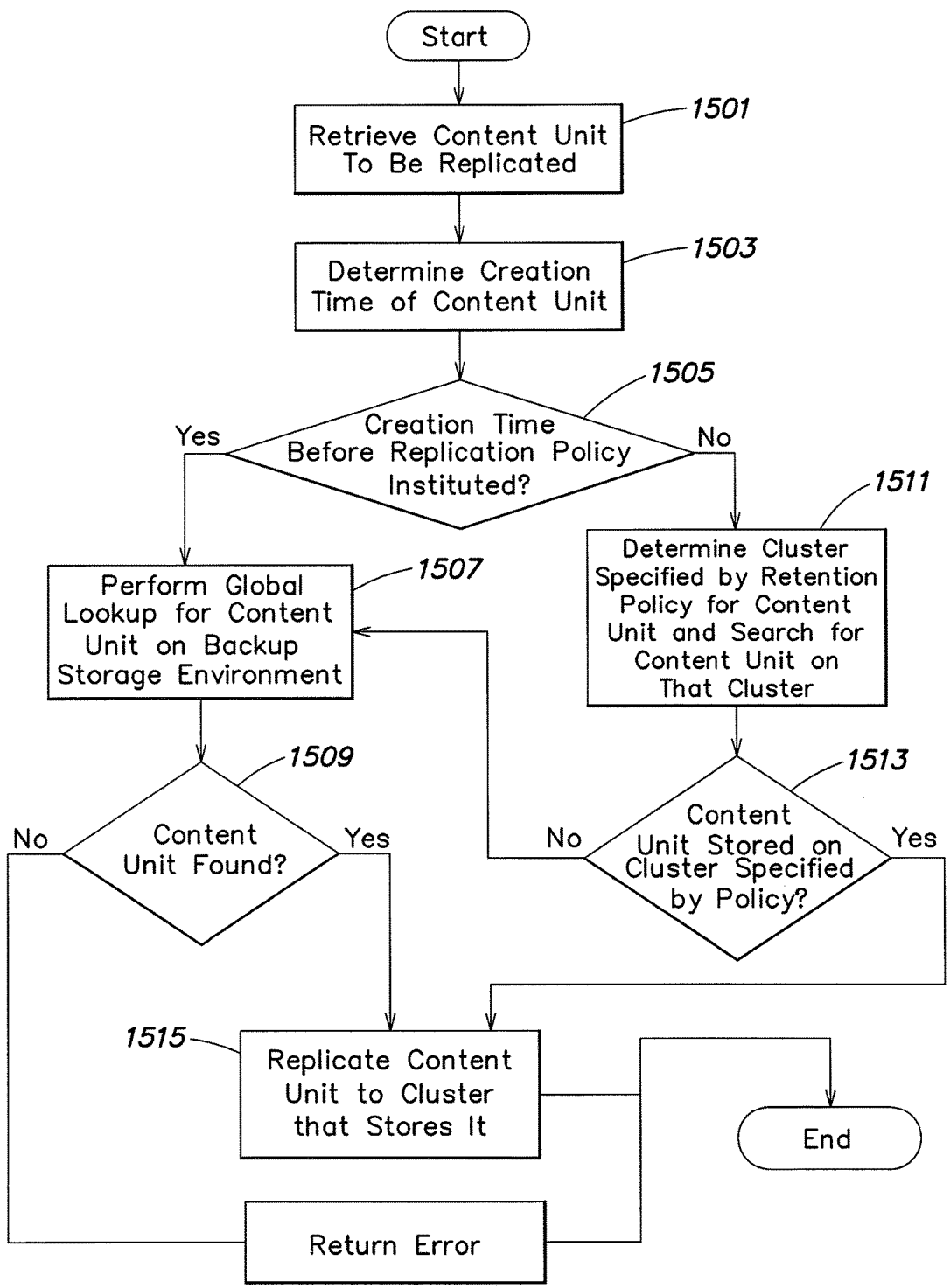
FIG. 15 is a flow chart of an illustrative process for replicating a previously-replicated content unit from a primary storage environment to a backup storage environment after modification of the content unit in the primary storage environment, in accordance with some embodiments.

The inventors have recognized that, after a cluster has replicated a content unit, the content of the content unit may be modified (e.g., in any of the ways discussed above). When a content unit that has been replicated is modified, it may be desired to replace the previously-stored content unit with the modified content unit on the backup storage environment. Thus, FIG. 15 shows a flow chart of a process that may be performed by a cluster in a primary storage environment to replicate a previously-replicated content unit to a backup storage environment after the content of the content unit has been modified. The process begins at act 1501, where a content unit that has been modified and is to be replicated is retrieved. The process next continues to act 1503, where the time of creation of the content unit to be replicated is determined. The time of creation of the content unit may be determined in any suitable way. For example, the time of creation may be stored in the content of the content unit or may be stored externally, as metadata associated with the content unit.

Once the creation time of the content unit is determined, the process continues to act 1505, where it is determined whether the content unit was created before the replication policy was instituted. If it is determined that the content unit was not created before the replication policy was instituted, then the process continues to act 1511, where the replication policy is accessed to determine which cluster in the backup storage environment the policy specifies as the replication target for the content unit. The process continues to act 1513, where a search is performed on the cluster in the backup storage environment identified in act 1511 to determine if the previously-replicated copy of the content unit is stored on that cluster. If the content unit is stored on that cluster, the process continues to act 1515, where the replication is performed to the cluster in the backup storage environment that already stores the content unit (i.e., so that the modified content unit replaces the previously-replicated copy). If, at act 1513, it is determined that the content unit is not stored on the cluster identified in act 1511, the process continues to act 1507, where a search for the content unit is performed on each cluster in the backup storage environment. The process next continues to act 1509, where it is determined if, as a result of the search performed in act 1507, the content unit was found on one of the clusters. If the content unit was not found, then the process continues to act 1517, where an error is returned. If the content unit was found, then the process continues to act 1515, where the replication is performed to the cluster in the backup storage environment that already stores the content unit (i.e., so that the modified content unit replaces the previously-replicated copy).

If, at act 1505, it is determined that the content unit was created before the replication policy was instituted. the process proceeds to act 1507, where a search for the content unit is performed on each cluster in the backup storage environment. The process next continues to act 1509, where it is determined if, as a result of the search performed in act 1507, the content unit was found on one of the clusters. If the content unit was not found, then the process continues to act 1517, where an error is returned. If the content unit was found, then the process continues to act 1515, where the replication is performed to the cluster in the backup storage environment that already stores the content unit (i.e., so that the modified content unit replaces the previously-replicated copy).

IV. Additional Information

The storage clusters and host computers described above may be implemented in any suitable way. In embodiments in which a storage cluster is a distributed storage system, each node may be implemented as a computer. In embodiments in which a storage cluster is not distributed, the storage cluster itself may be implemented as a computer. The host computers described above may also each be implemented as a computer.

Figure 16:
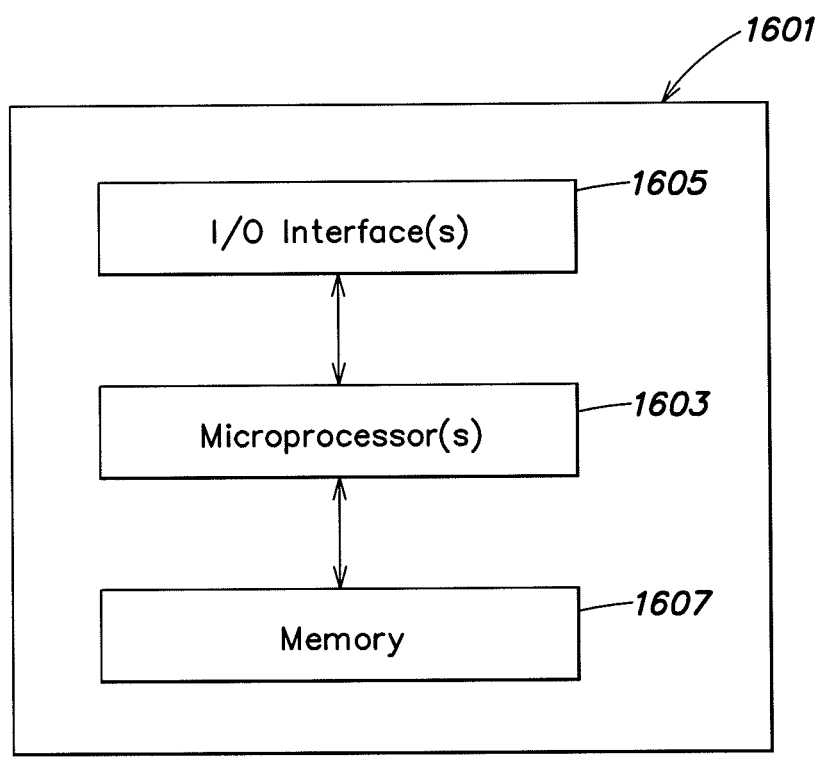
FIG. 16 is a block diagram of a computer that may be used in some embodiments to implement certain systems.

FIG. 16 is a block diagram of a computer that may be used, in some embodiments, to implement a storage cluster, node in a storage cluster, or a host computer. As shown in FIG. 16, computer 1601 includes a hardware microprocessor(s) 1603, an input/output (I/O) interface(s) 1605, and a memory 1607. Memory 1607 may include any suitable type of memory, including one or more storage devices, a system main memory, a cache, or any other suitable type of memory. Memory 1607 may store, inter alia, processor executable instructions that are executed by microprocessor(s) 1603. Microprocessor(s) 1603 may include one or more general purpose hardware processors and may execute the processor-executable instructions stored in memory 1607. I/O interface(s) 1605 may be any suitable interface(s) used to receive information from and send information to any entity external to computer 1601.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the above-described embodiments comprises at least one computer-readable medium encoded with a computer program (e.g., a plurality of instructions), which, when executed on a processor, performs the above-discussed functions of these embodiments. As used herein, the term computer-readable medium encompasses any computer-readable medium that can be considered to be a process, a machine, a manufacture, and/or a composition of matter, but does not encompass any medium that cannot be considered to be a process, a machine, a manufacture, and/or composition of matter. A computer-readable medium may be, for example, a tangible medium on which computer-readable information may be encoded or stored, a storage medium on which computer-readable information may be encoded or stored, and/or a non-transitory medium on which computer-readable information may be encoded or stored. Examples of computer-readable media include a computer memory (e.g., a ROM, a RAM, a flash memory, or other type of computer memory), a magnetic disc or tape, an optical disc, and/or other types of computer-readable media that can be considered to be a process, a machine, a manufacture, and/or a composition of matter.

The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

In various examples described above, content addresses were described to include alphabetic characters 'A'-'Z'. It should be understood that these content addresses were given only as examples, and that content addresses may include any alphanumeric character, series of bits, or any other suitable character, as the invention is not limited in this respect.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of accessing a content unit stored in a storage environment that includes a plurality of storage clusters, wherein the content unit is stored on at least two of the plurality of storage clusters, the method comprising acts of:
   initiating an operation to modify the content unit;
   causing each of the plurality of storage clusters to perform a search for the content unit;
   identifying, based on the search, the at least two storage clusters that store the content unit;
   determining a group of the at least two identified storage clusters, the group comprising more than one of the at least two storage clusters, wherein each of the storage clusters of the group:
   (a) stores a respective version of the content unit; and
   (b) does not store information indicating that the respective version is invalid;
   selecting a first storage cluster of the group as storing a valid version of the content unit;
   performing the operation to modify the content unit on the valid version of the content unit stored by the selected first storage cluster; and
   storing, on at least a second storage cluster of the group, information indicating the content unit stored thereon is an invalid version of the content unit.

2. The method of claim 1, wherein the content unit is identified in the storage environment by an object identifier, and wherein the act of causing each of the plurality of storage clusters to perform a search for the content unit further comprises:
   sending a read request for the content unit to each of the plurality of storage clusters, wherein the read request identifies the content unit via the object identifier.

3. The method of claim 1, wherein the act of storing the information indicating the content unit is an invalid version of the content unit comprises storing the information indicating the content unit is an invalid version of the content unit in the content of the content unit.

4. The method of claim 1, wherein the information indicating the content unit is an invalid version of the content unit is stored external to the content unit.

5. The method of claim 4, wherein the information indicating the content unit is an invalid version of the content unit comprises a timestamp associated with the content unit.

6. The method of claim 5, wherein storing the information indicating the content unit is an invalid version of the content unit comprises modifying the timestamp to a value that indicates that the content unit is an invalid version.

7. The method of claim 6, wherein the timestamp is used to indicate, for valid versions of the content unit, a time of storage of the content unit on the one of the plurality of storage clusters on which it is stored.

8. At least one computer readable medium encoded with instructions that, when executed on a computer system, perform a method of accessing a content unit stored in a storage environment that includes a plurality of storage clusters, wherein the content unit is stored on at least two of the plurality of storage clusters, the method comprising acts of:
    initiating an operation to modify the content unit;
    causing each of the plurality of storage clusters to perform a search for the content unit;
    identifying, based on the search, the at least two storage clusters that store the content unit;
    determining a group of the at least two identified storage clusters, the group comprising more than one of the at least two storage clusters, wherein each of the storage clusters of the group:
        (a) stores a respective version of the content unit; and
        (b) does not store information indicating that the respective version is invalid;
    selecting a first storage cluster of the group as storing a valid version of the content unit;
    performing the operation to modify the content unit on the valid version of the content unit stored by the selected first storage cluster; and
    storing, on at least a second storage cluster of the group, information indicating the content unit stored thereon is an invalid version of the content unit.

9. The at least one computer readable medium of claim 8, wherein the content unit is identified in the storage environment by an object identifier, and wherein the act of causing each of the plurality of storage clusters to perform a search for the content unit further comprises:
    sending a read request for the content unit to each of the plurality of storage clusters, wherein the read request identifies the content unit via the object identifier.

10. The at least one computer readable medium of claim 8, wherein the act of storing the information indicating the content unit is an invalid version of the content unit comprises storing the information indicating the content unit is an invalid version of the content unit in the content of the content unit.

11. The computer system of claim 8, wherein the information indicating the content unit is an invalid version of the content unit is stored in a status content unit.

12. The at least one computer readable medium of claim 8, wherein the information indicating the content unit is an invalid version of the content unit is stored external to the content unit.

13. The at least one computer readable medium of claim 12, wherein the information indicating the content unit is an invalid version of the content unit comprises a timestamp associated with the content unit.

14. The at least one computer readable medium of claim 13, wherein storing the information indicating the content unit is an invalid version of the content unit comprises modifying the timestamp to a value that indicates that the content unit is an invalid version.

15. The at least one computer readable medium of claim 14, wherein the timestamp is used to indicate, for valid versions of the content unit, a time of storage of the content unit on the one of the plurality of storage clusters on which it is stored.

16. A computer system that operates as one of a plurality of storage clusters in a storage environment, the storage cluster comprising:
    at least one memory that stores processor-executable instructions for accessing a content unit, wherein the content unit is stored on at least two of the plurality of storage clusters; and
    at least one microprocessor, coupled to the at least one memory, that executes the processor-executable instructions to:
    initiate an operation to modify the content unit;
    cause each of the plurality of storage clusters to perform a search for the content unit;
    identify, based on the search, the at least two storage clusters that store the content unit;
    determine a group of the at least two identified storage clusters, the group comprising more than one of the at least two storage clusters, wherein each of the storage clusters of the group:
        (a) stores a respective version of the content unit; and
        (b) does not store information indicating that the respective version is invalid;
    select a first storage cluster of the group as storing a valid version of the content unit;
    perform the operation to modify the content unit on the valid version of the content unit stored by the selected first storage cluster; and
    store, on at least a second storage cluster of the group, information indicating the content unit stored thereon is an invalid version of the content unit.

17. The computer system of claim 16, wherein the content unit is identified in the storage environment by an object identifier, and wherein the act of causing each of the plurality of storage clusters to perform a search for the content unit further comprises:
    sending a read request for the content unit to each of the plurality of storage clusters, wherein the read request identifies the content unit via the object identifier.

18. The computer system of claim 16, wherein the act of storing the information indicating the content unit is an invalid version of the content unit comprises storing the information indicating the content unit is an invalid version of the content unit in the content of the content unit.

19. The computer system of claim 16, wherein the information indicating the content unit is an invalid version of the content unit is stored in a status content unit.

20. The computer system of claim 16, wherein the information indicating the content unit is an invalid version of the content unit is stored external to the content unit.

\* \* \* \* \*